US 9,915,980 B2

(12) United States Patent
Park et al.

(10) Patent No.: US 9,915,980 B2
(45) Date of Patent: Mar. 13, 2018

(54) ELECTRONIC DEVICE AND ASSEMBLY STRUCTURE THEREOF

(71) Applicant: Samsung Electronics Co., Ltd., Gyeonggi-do (KR)

(72) Inventors: Seung-Hwa Park, Gyeonggi-do (KR); Byung-Sun Kim, Seoul (KR); Hyun-Mi Cheong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 279 days.

(21) Appl. No.: 14/243,216

(22) Filed: Apr. 2, 2014

(65) Prior Publication Data

US 2014/0307393 A1 Oct. 16, 2014

(30) Foreign Application Priority Data

Apr. 16, 2013 (KR) .......................... 10-2013-0041810

(51) Int. Cl.
*H05K 7/14* (2006.01)
*G06F 1/16* (2006.01)

(52) U.S. Cl.
CPC .......... *G06F 1/1662* (2013.01); *G06F 1/1656* (2013.01)

(58) Field of Classification Search
CPC .... G06F 1/1626; G06F 1/1601; G06F 1/1613; G06F 1/1615; G06F 1/1633; G06F 1/1656; H04M 1/0202
USPC ........................ 361/727, 625, 679.26, 679.55
See application file for complete search history.

(56) References Cited

U.S. PATENT DOCUMENTS

| | | | | |
|---|---|---|---|---|
| 6,704,194 B2* | 3/2004 | Koo | .................. | G06F 1/1616 341/22 |
| 7,374,438 B2* | 5/2008 | Jiang | .................. | H05K 5/0221 292/8 |
| 2002/0080297 A1* | 6/2002 | Sung | .................. | G02F 1/133308 349/58 |
| 2004/0061997 A1* | 4/2004 | Skinner | ................. | G06F 1/1616 361/679.55 |
| 2007/0217140 A1* | 9/2007 | Chen | .................. | G06F 1/1679 361/679.34 |
| 2008/0253094 A1 | 10/2008 | Doczy et al. | | |
| 2010/0091454 A1* | 4/2010 | Degner | ................. | G06F 1/1616 361/679.58 |
| 2012/0050639 A1* | 3/2012 | Kim | .................. | G02F 1/133308 349/58 |

(Continued)

FOREIGN PATENT DOCUMENTS

JP 2009135231 6/2009
KR 1020060003555 1/2006

*Primary Examiner* — Jerry Wu
*Assistant Examiner* — Stephen Sul
(74) *Attorney, Agent, or Firm* — The Farrell Law Firm, P.C.

(57) ABSTRACT

An electronic device is provided that includes a front housing arranged in a front portion of the electronic device, and a bracket connected to the front housing, to which a plurality of electronic parts of the electronic device are affixed. The electronic device also includes a rear housing arranged in a rear portion of the electronic device and including at least one slider and at least one rail. Each of the at least one slider is connected to a respective rail. The at least one slider is slidable on and elastically supported by the at least one rail, without being released from the at least one rail. The rear housing is detachable from the bracket by the at least one slider.

7 Claims, 31 Drawing Sheets

(56) References Cited

U.S. PATENT DOCUMENTS

| | | | | |
|---|---|---|---|---|
| 2012/0050963 A1* | 3/2012 | Chen | ............... | H01M 2/1066 361/679.01 |
| 2012/0314346 A1* | 12/2012 | Chao | ............... | H05K 5/02 361/679.01 |
| 2013/0273981 A1* | 10/2013 | Liu | ............... | H01M 2/1022 455/575.1 |
| 2013/0322028 A1* | 12/2013 | Yu | ............... | H05K 7/1461 361/741 |

* cited by examiner

ELECTRONIC DEVICE AND ASSEMBLY STRUCTURE THEREOF

PRIORITY

This application claims priority under 35 U.S.C. § 119(a) to a Korean Patent Application filed in the Korean Intellectual Property Office on Apr. 16, 2013 and assigned Serial No. 10-2013-0041810, the contents of which are incorporated herein by reference.

BACKGROUND OF THE INVENTION

1. Field of the Invention

The present invention, generally relates to an electronic device with a housing and an assembly structure thereof.

2. Description of the Related Art

Due to the growth of electronic communication industries, electronic devices such as, for example, mobile communication terminals (cellular phones), electronic schedulers, personal complex terminals, Televisions (TVs), laptop computers, and the like, are becoming necessities of modern society, while also becoming a significant means for delivery of rapidly changing information. These electronic devices provide conveniences such as a Graphical User Interface (GUI) environment using a touch screen, and provide various forms of multi-media based on a web environment.

As the demand for electronic devices emphasizing portability increases, slimmer and more lightweight electronic devices are being produced. Also, the preference for an electronic device with a large touch screen is increasing. As the touch screen increases in size, a volume of the electronic device also increases. A solution to this volume increase is to decrease a thickness of a frame (e.g., a bezel) of the electronic device.

SUMMARY OF THE INVENTION

The present invention has been made to address at least the above problems and/or disadvantages and to provide at least the advantages described below. Accordingly, one aspect of the present invention increases a mechanical connecting force between housings forming an electronic device and guaranteeing rigidity of the electronic device.

Another aspect of the present invention stops gap widening between connected housings forming an electronic device.

A further aspect of the present invention easily separates a detachable housing of metal or nonmetal material by simple handling.

Yet another aspect of the present invention increases a connecting force between a metal or nonmetal bracket, which is housed in an electronic device to support electronic parts (e.g., a touch screen, a Printed Circuit Board (PCB) and the like), and a housing forming the electronic device, According to one aspect of the present invention, an electronic device is provided that includes a front housing arranged in a front portion of the electronic device, and a bracket connected to the front housing, to which a plurality of electronic parts of the electronic device are affixed. The electronic device also includes a rear housing arranged in a rear portion of the electronic device and including at least one slider and at least one rail. Each of the at least one slider is connected to a respective rail. The at least one slider is slidable on and elastically supported by the at least one rail, without being released from the at least one rail. The rear housing is detachable from the bracket by the at least one slider.

According to another aspect of the present invention, an electronic device is provided that includes a front housing arranged in a front portion of the electronic device, and a bracket connected to the front housing, to which a plurality of electronic parts of the electronic device are affixed. The electronic device also includes a rear housing arranged in a rear portion of the electronic device, and at least one shaft that is elastically supported in and movable in the bracket or the rear housing. The bracket and the rear housing are connected using a male hook and a female hook. The connection between the bracket and the rear housing is releasable by a movement of the at least one shaft.

According to another aspect of the present invention, an electronic device is provided that includes a front housing arranged in a front portion of the electronic device, and a rear housing arranged in a rear portion of the electronic device. The electronic device also includes a plurality of hook supports fixed to a plurality of frame bottoms of the rear housing and having hooks extending up from the frame bottoms. The electronic device additionally includes a bracket connected to the front housing, to which a plurality of electronic parts of the electronic device are affixed, and having hook catch jaws connectable with the hooks of the plurality of hook supports. The electronic device further includes a linkage arranged in a space between a sidewall of the rear housing and the plurality of hook supports. By means of a movement of the linkage, a force is applied to the hooks of the plurality of hook supports, the hooks of the plurality of hook supports are elastically bent and deformed by protrusions formed in the linkage, and the hooks of the plurality of hook supports are separable from the hook catch jaws of the bracket.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
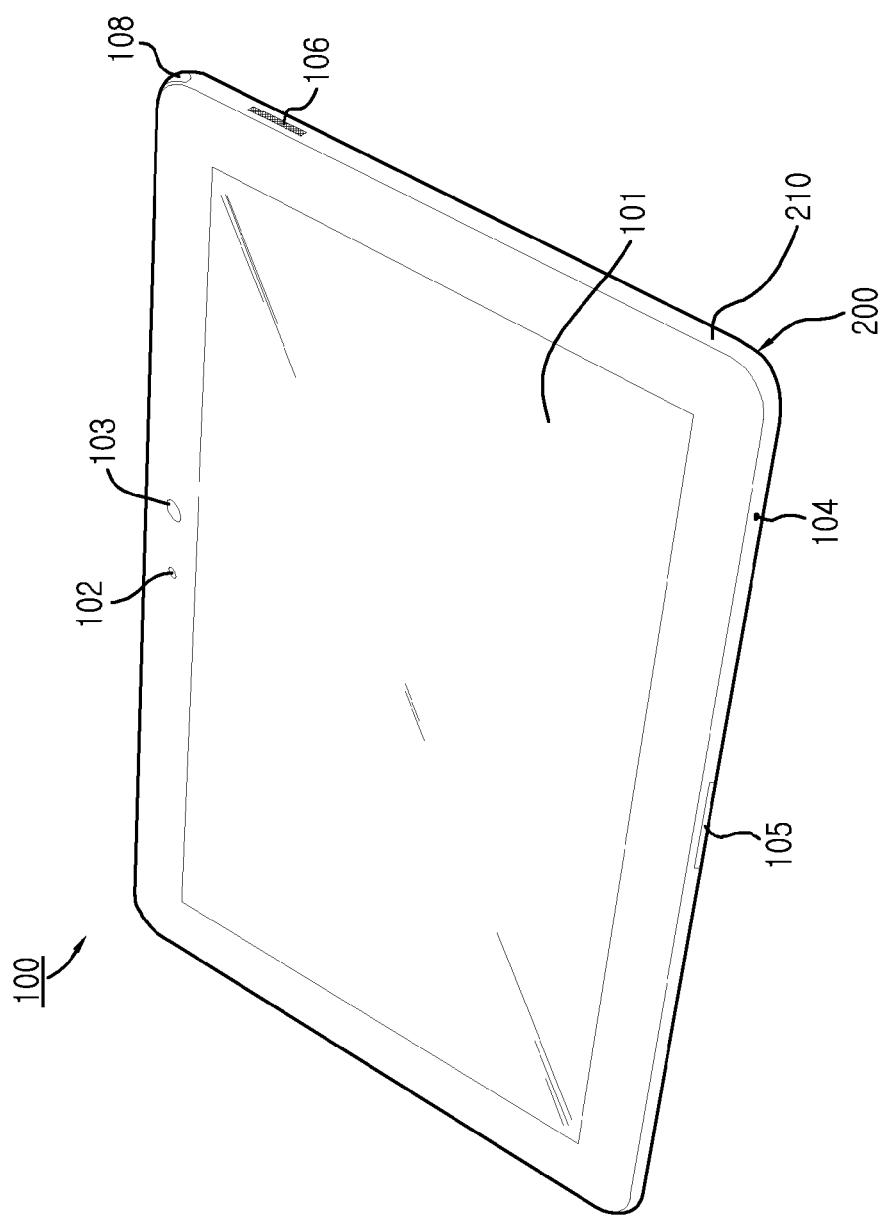
FIGS. 1 and 2 are diagrams illustrating perspective views of an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described below, which are defined considering functions in the present invention, can be different depending on user and operator's intention or practice. Therefore, the terms should be defined on the basis of the disclosure throughout this specification.

Figure 2:
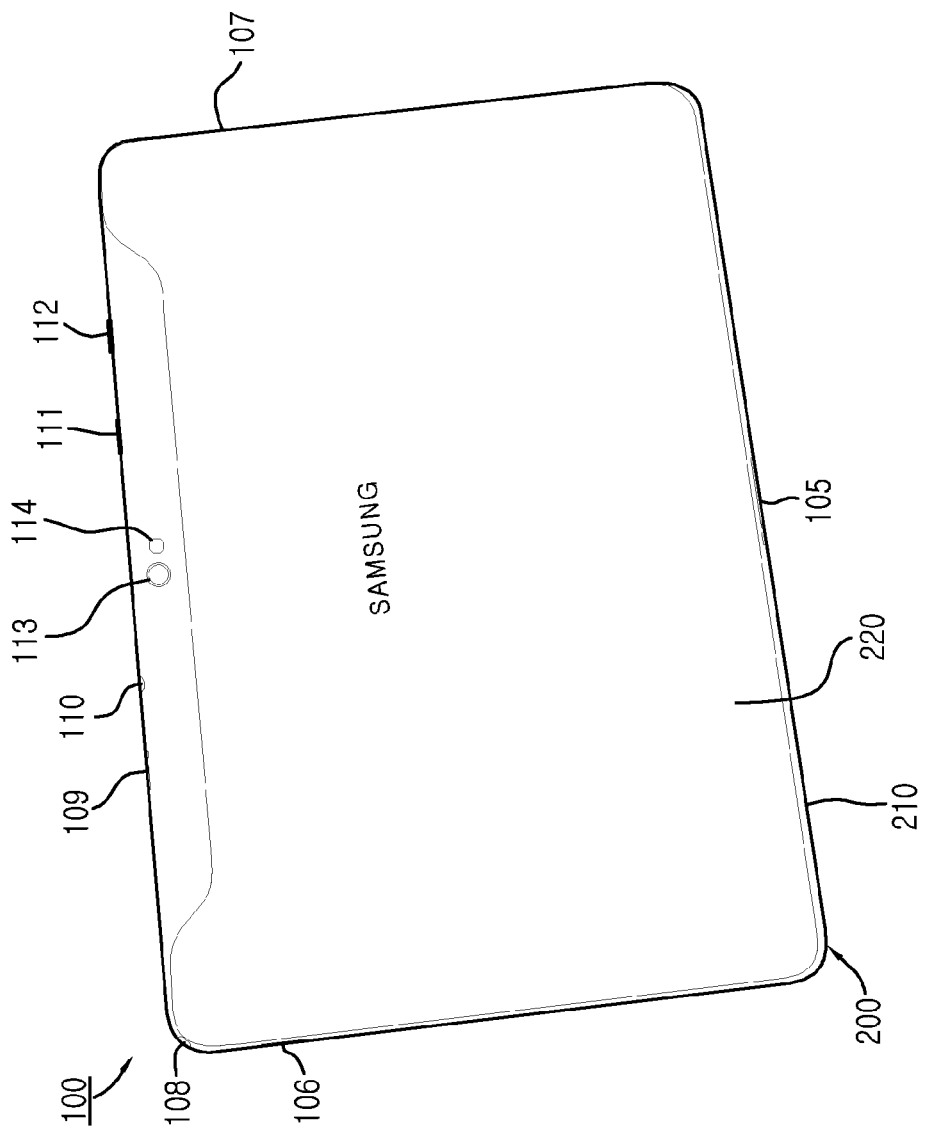

FIGS. 1 and 2 are diagrams illustrating perspective views of an electronic device, according to an embodiment of the present invention.

Referring to FIGS. 1 and 2, a touch screen 101 for displaying an image and receiving a touch input, an illumination sensor 102 for sensing brightness, and a capture camera 103 are installed in front surface of an electronic device 100. A microphone 104 for converting sound into an electrical signal and a Universal Serial Bus (USB) connecting and charging port 105 are installed at a lower end of the electronic device 100. Speakers 106 and 107 for outputting an electrical signal as sound are installed at both side ends of the electronic device 100, respectively. A Digital Multimedia Broadcasting (DMB) antenna 108 is installed at a right upper end of the electronic device 100. The antenna 108 can be drawn out and extended. A socket 109 capable of inserting a Universal Subscriber Identity Module (USIM) card is installed at an upper end of the electronic device 100 and, when not in use, the socket 109 can be plugged with a cover. A jack 110 capable of electrically connecting a plug, such as an earphone, an ear set, and the like, is installed at an upper end of the electronic device 100. A button 111 capable of adjusting a volume is installed at the upper end of the electronic device 100. A button 112 capable of powering on or off is installed at the upper end of the electronic device 100. A capture camera 113 and a capture flash 114 are installed in rear of the electronic device 100. The aforementioned electronic parts can be electrically connected with a Printed Circuit Board (PCB). The PCB, which is a substrate on which a basic circuit and a plurality of electronic parts are mounted, can configure an execution environment of the electronic device 100, maintain information thereof, enable stable driving of the electronic device 100, and make smooth a data input/output exchange of all devices of the electronic device 100. A battery is electrically connected with the PCB, and can supply driving power of the electronic device 100. The electronic parts can be mounted on the PCB, or can be electrically connected to the PCB by a cable and a Flexible Printed Circuit Board (FPCB).

The electronic device 100 includes a housing 200 capable of forming an appearance of the electronic device 100 and housing the electronic parts. The housing 200 includes a front housing 210 arranged in front of the electronic device 100, and a rear housing 220 arranged in rear of the electronic device 100. The electronic device 100 includes a bracket interposed between the front housing 210 and the rear housing 220. The bracket refers to a structure of metal or nonmetal material. The bracket is connected to the front housing 210, and can play a role of fixing and supporting a plurality of electronic parts. The rear housing 220 is detachable from the bracket.

Figure 3:
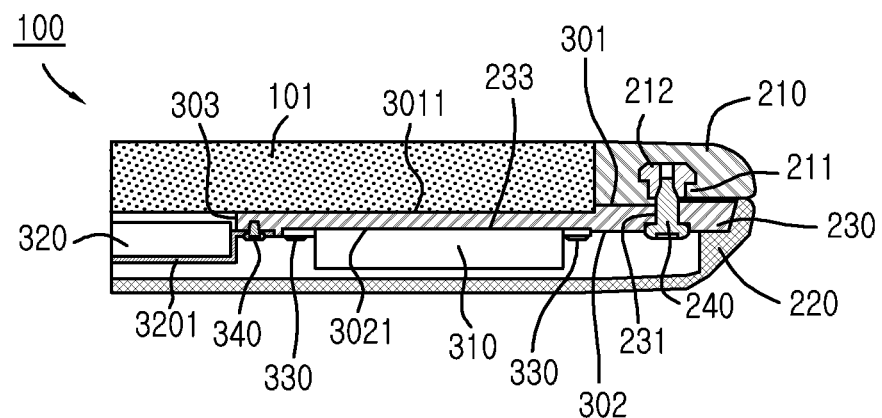
FIG. 3 is a diagram illustrating a cross section of a construction of an electronic device, according to an embodiment of the present invention.

FIG. 3 is a diagram illustrating a cross section of an electronic device, according to an embodiment of the present invention.

Referring to FIG. 3, the touch screen 101 is safely mounted in a groove 3011 provided in an upper part 301 of a bracket 230. The bracket 230 is attached to the front housing 210 using a screw 240, and the touch screen 101 is fixed between the bracket 230 and the front housing 210. A PCB 310 is fixed to a groove 3021 provided in a lower part 302 of the bracket 230 using screws 330. A battery 320 is attached to a metal plate 3201. The metal plate 3201 to which the battery 320 is attached can be fixed to a lower part of the bracket 230 using a screw 340. The metal plate 3201 to which the battery 320 is attached us arranged in an opening 303 provided in the bracket 230, and a part of the battery 320 can be fitted into the opening 303. The touch screen 101 is superposed with the PCB 310 and the battery 320. The PCB 310 may not be superposed with the battery 320.

The front housing 210 has a boss 211 for screw coupling with the bracket 230. The boss 211 can have a screw coupling part 212 whose screw hole is connected with a screw. The screw coupling part 212 is composed of metal and, upon injection molding, can be formed within the boss 211. The bracket 230 has a hole 231 for attachment with the boss 211 of the front housing 210. The screw 240 goes through the hole 231 of the bracket 230 and connects to the boss 211 of the front housing 210, whereby the front housing 210 and the bracket 230 are attached to each other. The boss 211 and the hole 231 can be arranged around a frame of the electronic device 100.

The rear housing 220 can be detached from the bracket 230, which is described in detail below.

Figure 4:
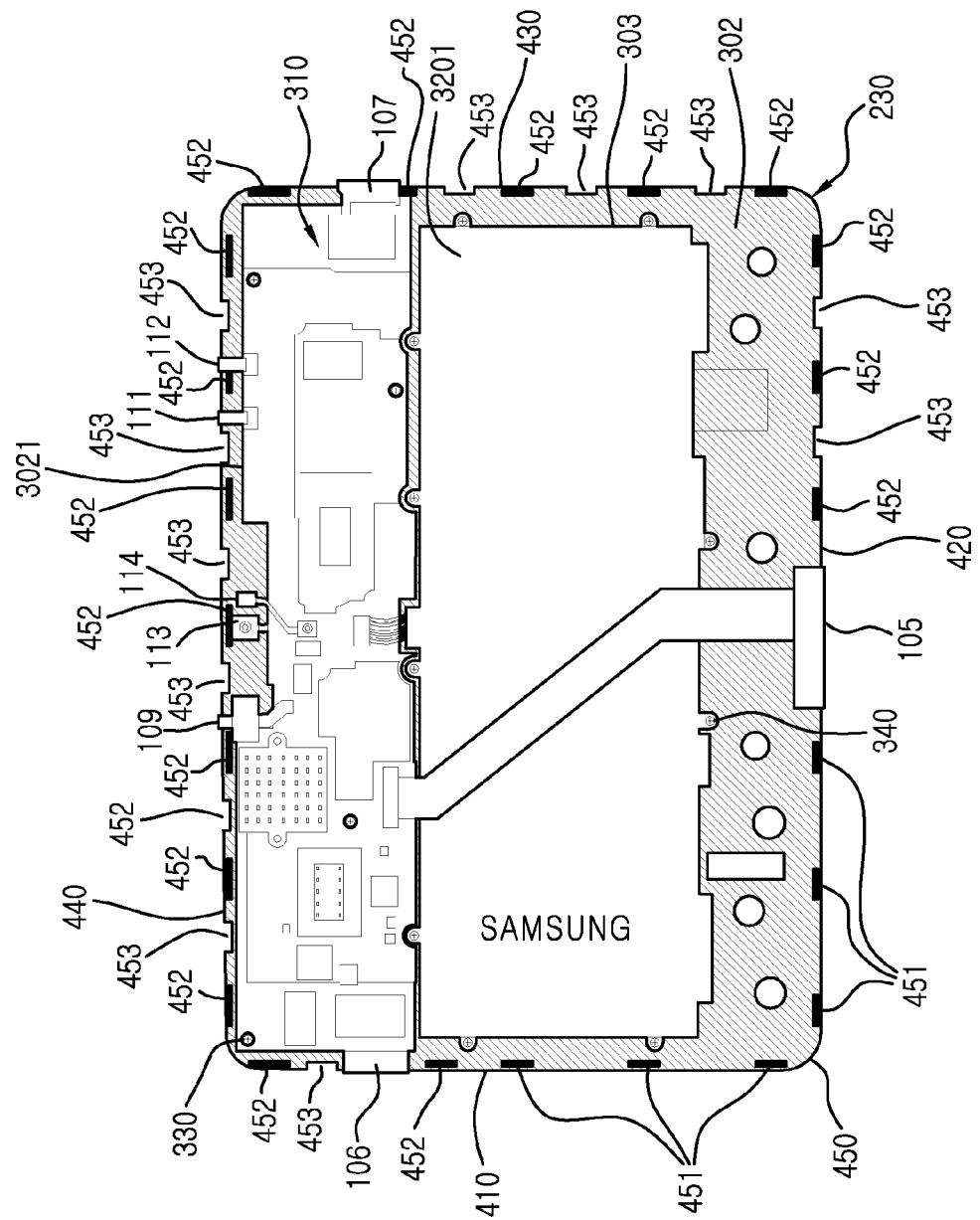
FIG. 4 is a diagram illustrating separation of a rear housing from an electronic device, according to an embodiment of the present invention.

FIG. 4 is a diagram illustrating separation of the rear housing from the electronic device, according to an embodiment of the present invention.

Referring to FIG. 4, the PCB 310 is fixed to the groove 3021 provided in the bracket 230. The metal plate 3201, to which the battery 320 is attached, is fixed to the opening 303 provided in the bracket 230 using the screw 340. Parts 105, 106, 107, 109, 111, 112, 113, 114 and the like can be fitted and fixed to the groove 3021 provided in the bracket 230. The PCB 310 and the metal plate 3201 may not be superposed with each other. Hook arms 451, coupling protrusions 452, and hook catch jaws 453 are formed in parallel at a left frame 410 of the bracket 230 and a lower frame 420 thereof. The coupling protrusions 452 and the hook catch jaws 453 are formed in parallel at a right frame 430 of the bracket 230 and an upper frame 440 thereof. The hook arms 451 and the coupling protrusions 452 extend vertically from the surface 302 of the bracket 230. The hook catch jaws 453 are of a shape that is opened outside the right frame 430. The hook catch jaws 453 are arranged between the coupling protrusions 452. The coupling protrusions 452 and the hook catch jaws 453 are not arranged between the hook arms 451. The hook arms 451 are arranged in parallel on a basis of a corner 450 at which the left frame 410 and the lower frame 420 are connected.

Figure 5:
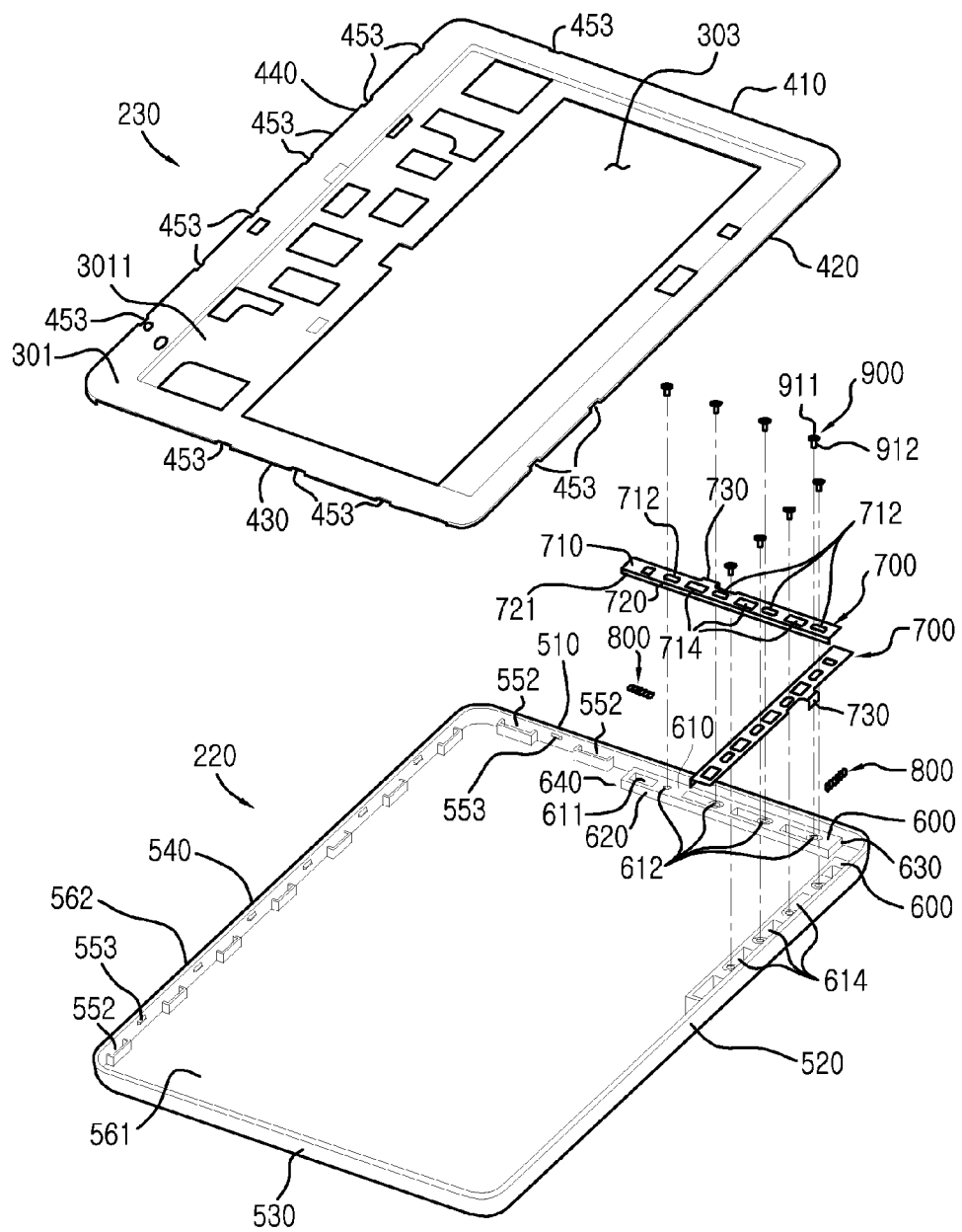
FIG. 5 is a diagram illustrating a perspective view of a connection between a bracket and a rear housing, according to an embodiment of the present invention.

FIG. 5 is a diagram illustrating a perspective view of a connection between the bracket and the rear housing, according to an embodiment of the present invention.

Referring to FIG. 5, the upper part 301 of the bracket 230 has the groove 3011 capable of safely mounting the touch screen 101. The bracket 230 has the opening 303 for fixing the metal plate 3201 to which the battery 320 is attached. The vertically extended hook arms (451 of FIG. 4) and coupling protrusions (452 of FIG. 4) are formed in the lower parts (302 of FIG. 3) of the left, lower, right, and upper four frames 410, 420, 430, and 440 of the bracket 320. The hook catch jaws 453 of the shape being opened outside are formed in the upper frame 440 of the bracket 230.

The rear housing 220 is a square vessel shape composed of a bottom 561 and sidewalls 562. Connection portions between the bottom 561 and the sidewalls 562 are a smooth shape. Connection portions between the sidewalls 562 are smooth rounded corners. The sidewalls 562 are erected vertically with respect to the bottom 561, while in other embodiments may not be erected vertically.

Coupling ribs 552 capable of being coupled with the coupling protrusions 452 of the bracket 230 are formed inside four frames 510, 520, 530, and 540 of the rear housing 220. If the rear housing 220 and the bracket 230 are connected to each other, the coupling protrusions 452 of the bracket 230 can be fitted into grooves of the coupling ribs 552 of the rear housing 220. The coupling ribs 552 are connected to the bottom 561 and sidewalls 562 of the rear housing 220, and the sidewalls 562 cannot be widened outside a predetermined extent or more by means of the coupling ribs 552.

Hook protrusions 553 capable of connecting with the hook catch jaws 453 of the bracket 230 are formed inside the sidewalls 562 of the rear housing 220. For example, when the rear housing 220 and the bracket 230 are connected to each other, the hook protrusions 553 can be restrained from riding and going over the hook catch jaws 453 of the bracket 230 and being released from the hook catch jaws 453 of the bracket 230, under elastic bending deformation of the sidewalls 562. Rails 600 are installed on the bottom 561 of the intersecting frames 510 and 520 of the rear housing 220, respectively. The rails 600 can be generally rectangular-parallelepiped horizontal members. Compression spring housing parts 611 capable of housing compression springs 800 and screw coupling parts 612 for attachment with screws 900 are formed in upper parts 610 of the rails 600. Hook housing parts 614 are formed in the upper parts 610 of the rails 600 to house hooks (4511 of FIG. 12) formed at ends of the hook arms 451 of the bracket 230. A space can be provided between an outer lateral part 630 of the rail 600 and the sidewalls 562 of the rear housing 220.

Sliders 700 are safely mounted on the rails 600, and are slidable in the lengthwise directions of the rails 600, while being elastically supported by the compression spring 800. The slider 700 includes an upper wall 710 being in contact with the upper part 610 of the rail 600, an inner sidewall 720 being in contact with an inner lateral part 620 of the rail 600, and an outer sidewall 730 being in contact with the outer lateral part 630 of the rail 600. The outer sidewall 730 of the slider 700 is arranged in the space between the outer lateral part 630 of the rail 600 and the sidewalls 562 of the rear housing 220. The outer sidewall 730 of the slider 700 can be relatively smaller than the inner sidewall 720 of the slider 700. The upper wall 710 of the slider 700 has guide holes 712 provided lengthwise in the movement direction of the slider 700. The screw coupling parts 612 of the rail 600 can extend vertically and go through the guide holes 712 of the slider 700. If the slider 700 is moved, the screw coupling parts 612 of the rail 600 on the guide holes 712 of the slider 700 can be changed in position.

The slider 700 includes a support (713 of FIG. 12) inserted into the compression spring housing part 611 of the rail 600. The compression spring 800 is in touch with the support 713 of the slider 700 at one end, and is in touch with the inside of the compression spring housing part 611 at the other end. The slider 700 can be subjected to elastic support of the compression spring 800 by means of the support 713. The slider 700 can have the property of trying to return to the original position by means of the compression spring 800.

The upper wall 710 of the slider 700 has hook catch holes 714 attachable with the hook arms 451 of the bracket 230. Hooks (4511 of FIG. 12) of the hook arms 451 of the bracket 230 have inclined surfaces of a shape of getting slimmer as going to the terminal. Frames of the hook catch holes 714 of the slider 700 have inclined surfaces matching with the inclined surfaces of the hooks 4511 of the hook arms 451. If the hooks 4511 of the hook arms 451 of the bracket 230 pass through the hook catch holes 714 of the slider 700, the frames of the hook catch holes 714 of the slider 700 are pressurized by the hooks 4511 of the hook arms 451 of the bracket 230 and thus, the slider 700 is slidable. If the hooks 4511 of the hook arms 451 of the bracket 230 are completely housed in the hook housing parts 614 of the rail 600, the slider 700 can be returned to the original position. The hooks 4511 of the hook arms 451 of the bracket 230 housed in the hook housing parts 614 of the rail 600 are caught by the frames of the hook catch holes 714 of the slider 700 returned to the original position, and thus cannot be released vertically.

A male hook 721 is formed at a lower end of the inner sidewall 720 of the slider 700. A female hook 640 is formed in the bottom 561 of the rear housing 220 such that the female hook 640 can be hook coupled with the male hook 721 of the slider 700. If the slider 700 compresses the compression spring 800 while moving a threshold distance or more, the male hook 721 of the slider 700 can be connected to the female hook 640 of the rear housing 220 and thus the slider 700 cannot be returned by the elasticity of the compression spring 800.

Necks 912 of the screws 900 have threads of predetermined pitches, and the necks 912 of the screws 900 can be coupled to the screw coupling parts 612 of the rail 600 going through the guide holes 712 of the slider 700. The upper wall 710 of the slider 700 can be arranged between heads 911 of the screws 900 and the upper part 610 of the rail 600. The heads 911 of the screws 900 have larger widths than the guide holes 712 of the slider 700 and thus, the slider 700 cannot be released vertically by means of the heads 911 of the screws 900.

Figure 6:
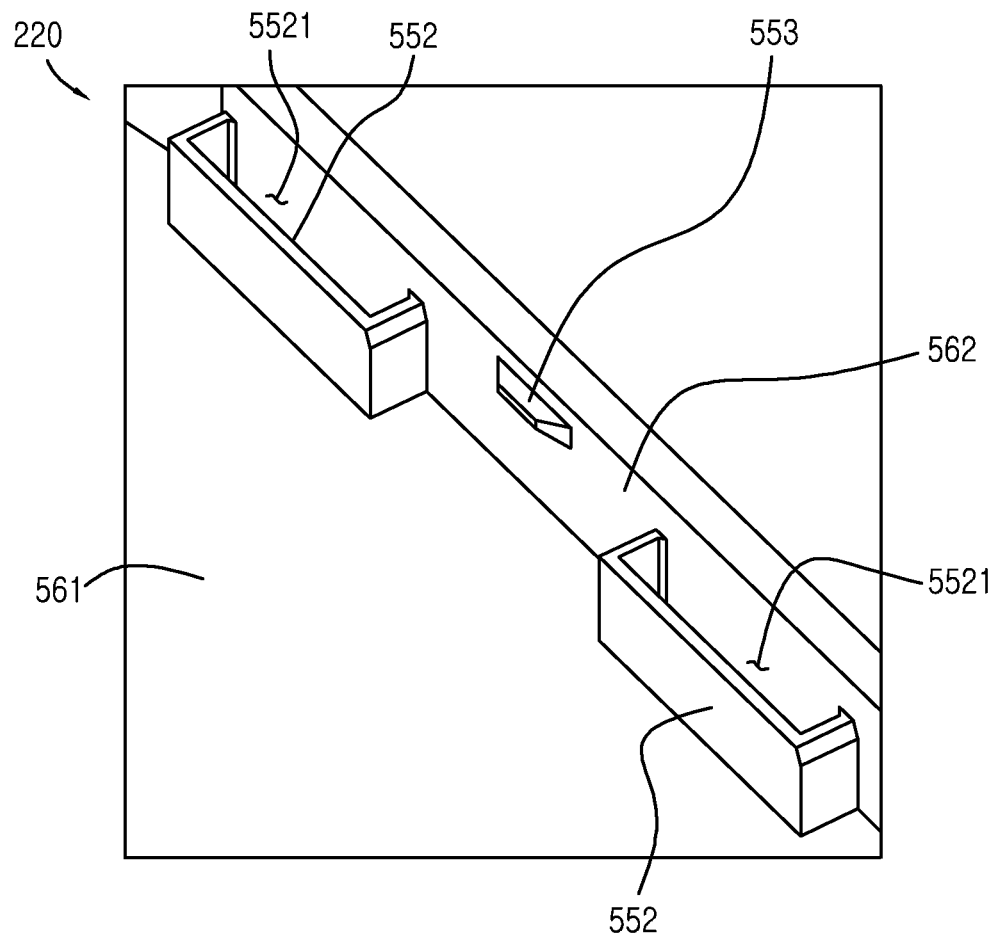
FIG. 6 is a diagram illustrating the inside of a rear housing, according to an embodiment of the present invention.

FIG. 6 is a diagram illustrating the inside of the rear housing, according to an embodiment of the present invention.

Referring to FIG. 6, the coupling ribs 552 are connected to the bottom 561 and sidewalls 562 of the rear housing 220. As described above, the coupling ribs 552 can stop the sidewalls 562 from being widened outside a predetermined extent or more. The coupling ribs 552 have grooves 5521 capable of fitting the coupling protrusions 452 of the bracket 230. The hook protrusions 553 are formed at the sidewalls 562 of the rear housing 220, and are arranged between the coupling ribs 552.

Figure 7:
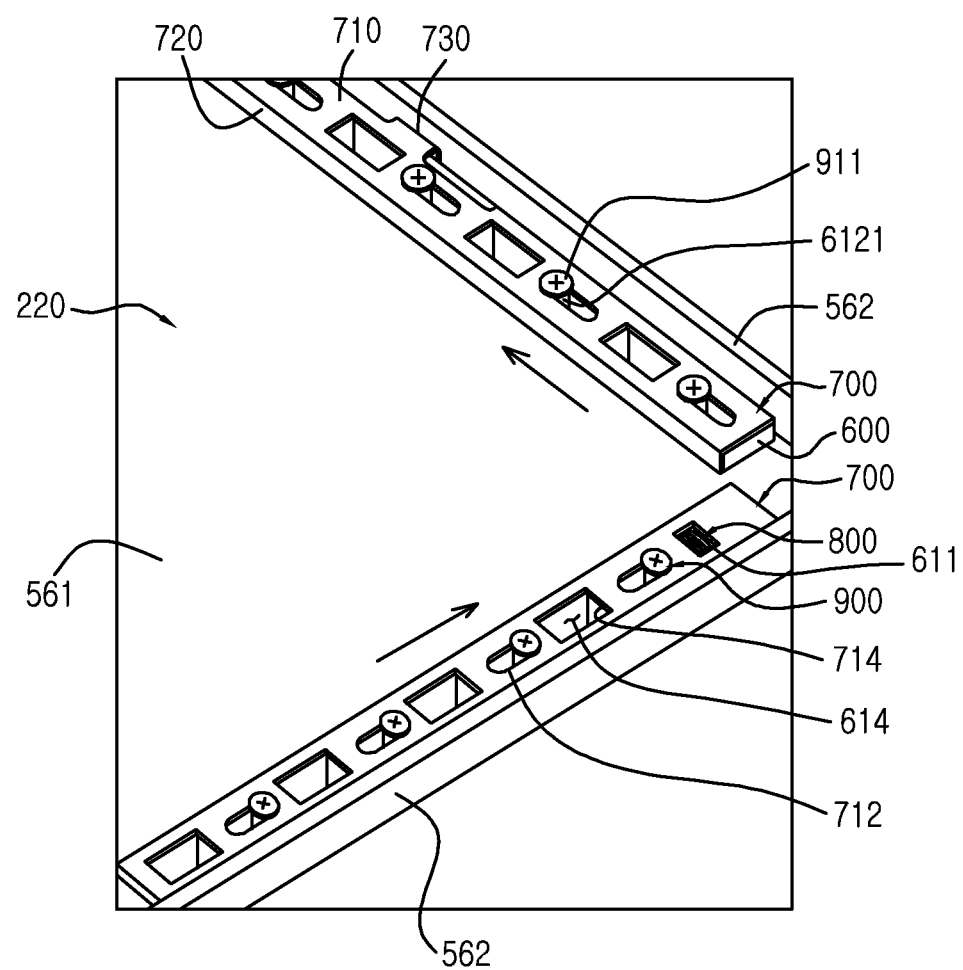
FIG. 7 is a diagram illustrating a perspective view of a connection of a rear housing and a slider, according to an embodiment of the present invention.

FIG. 7 is a diagram illustrating a perspective view of a connection of the rear housing and the slider, according to an embodiment of the present invention.

Referring to FIG. 7, the sliders 700 are safely mounted on the rails 600 formed on the bottom 561 of the rear housing 220, and the screw coupling parts 612 of the rails 600 go through the guide holes 712 provided in the sliders 700. The screws 900 are coupled to the screw coupling parts 612 of the rails 600. The upper wall 710 of the slider 700 is arranged between the heads 911 of the screws 900 and the upper part 610 of the rail 600. The heads 911 of the screws 900 have larger widths than the guide holes 712 of the slider 700 and thus, the slider 700 cannot be released vertically by means of the heads 911 of the screws 900. The hook catch holes 714 are formed in the upper walls 710 of the sliders 700 and are attached with the hook arms 451 of the bracket 230. The hook housing parts 614 are formed in the rear housing 220 and can house the hooks 4511 of the hook arms 451 of the bracket 230. The compression spring housing parts 611 are formed in the rail 600 and house the compression springs 800. While being moved on the rails 600, the sliders 700 are subjected to the elastic support of the compression springs 800 housed in the compression spring housing parts 611 of the rails 600.

Figure 8:
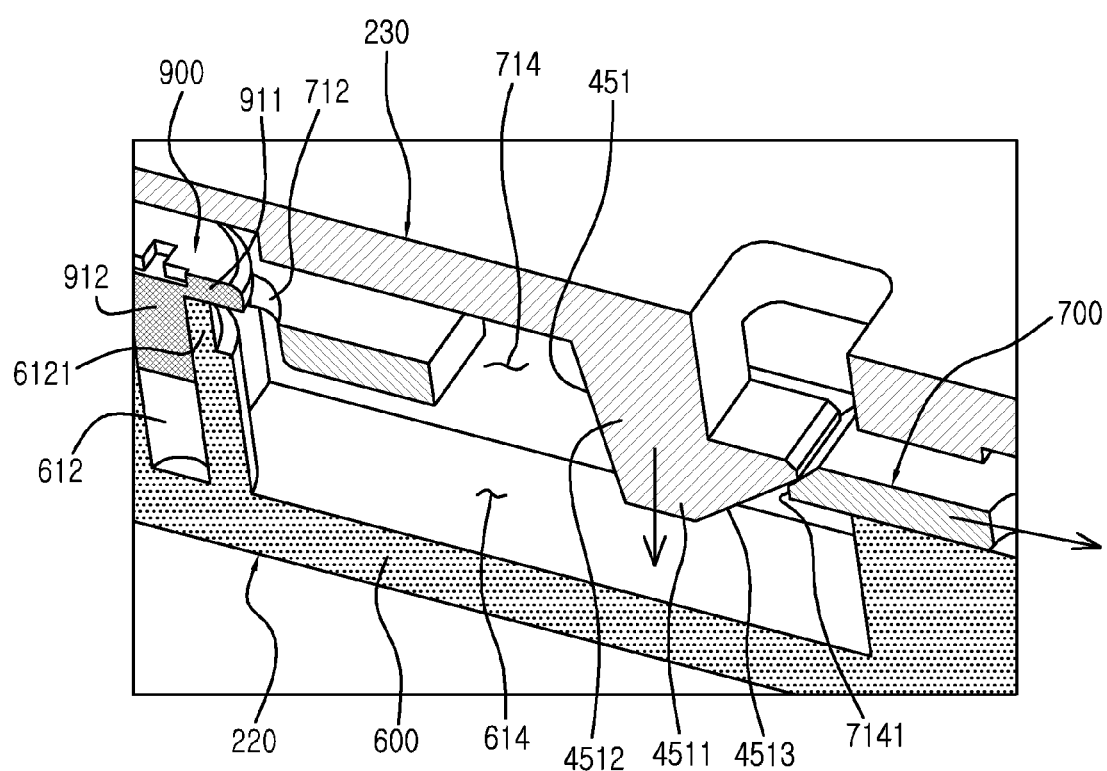
FIGS. 8 and 9 are diagrams illustrating cross sections that show an operation of connecting a bracket and a rear housing, according to an embodiment of the present invention.
Figure 9:
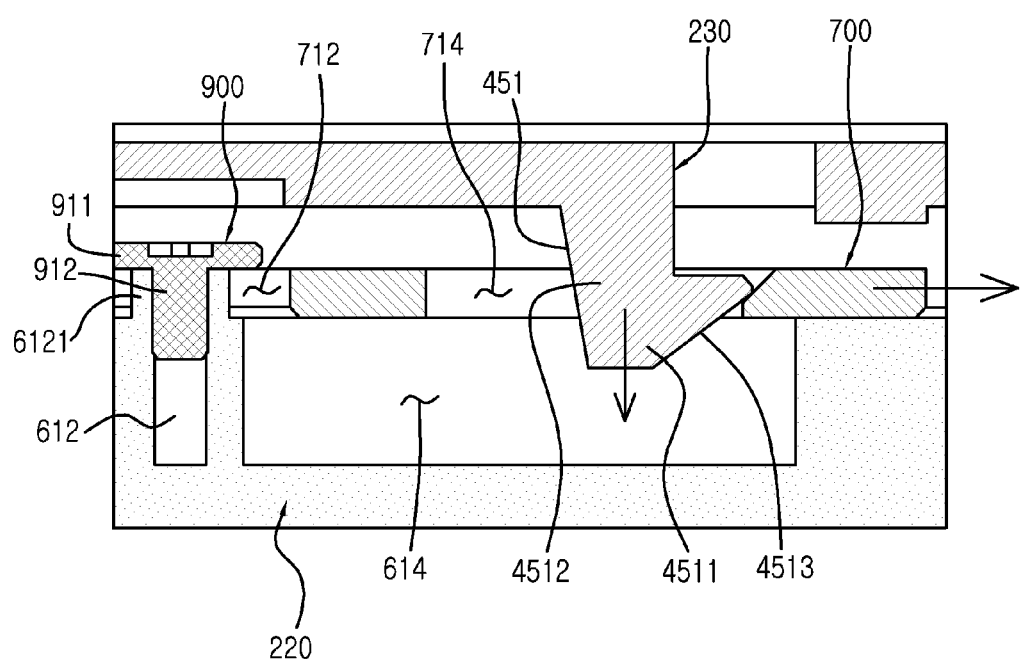

FIGS. 8 and 9 are diagrams illustrating cross sections showing the operation of connecting the bracket and the rear housing, according to an embodiment of the present invention.

Referring to FIGS. 8 and 9, the screw coupling part 612 formed in the rail 600 of the rear housing 220 extends vertically, and an upper end part 6121 of the screw coupling part 612 goes through the guide hole 712 of the slider 700. The neck 912 of the screw 900 is coupled to the screw coupling part 612, and the head 911 of the screw 900 is in touch with the upper end part 6121 of the screw coupling part 612. Hooks 4511 of the hook arms 451 of the bracket 230 have inclined surfaces 4513 of a shape of getting slimmer as going to the terminal. Frames 7141 of the hook catch holes 714 of the slider 700 have inclined surfaces matching with the inclined surfaces of the hooks 4511 of the hook arms 451. If the hooks 4511 of the hook arms 451 of the bracket 230 pass through the hook catch holes 714 of the slider 700, the frames 7141 of the hook catch holes 714 of the slider 700 are pressurized by the hooks 4511 of the hook arms 451 of the bracket 230 and thus, the slider 700 is slidable. Because the guide holes 712 of the slider 700 are laid lengthwise in the movement direction of the slider 700, upon movement of the slider 700, the screw coupling parts 612 of the rail 600 on the guide holes 712 of the slider 700 can be changed in position.

Figure 10:
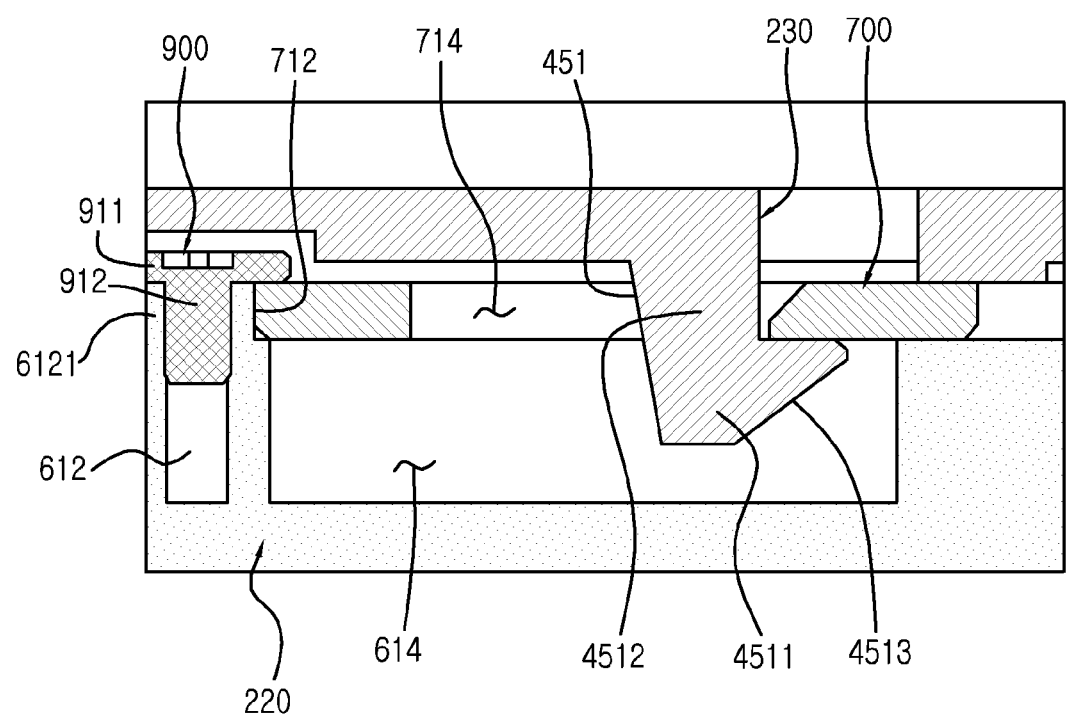
FIG. 10 is a diagram illustrating a cross section that shows a state of a connected bracket and rear housing, according to an embodiment of the present invention.

FIG. 10 is a diagram illustrating a cross section showing the connected bracket and rear housing, according to an embodiment of the present invention.

Referring to FIG. 10, if the bracket 230 is fully connected to the rear housing 220 following the operation of FIG. 9, the hooks 4511 of the hook arms 451 of the bracket 230 leave the hook catch holes 714 of the slider 700, and are housed in the hook housing parts 614 of the rail 600. If the hooks 4511 of the hook arms 451 of the bracket 230 are completely housed in the hook housing parts 614 of the rail 600, neck portions 4512 of the hook arms 451 of the bracket 230 are arranged in the hook catch holes 714 of the slider 700, and the slider 700 is returned to the original position. The hooks 4511 of the hook arms 451 of the bracket 230 housed in the hook housing parts 614 of the rail 600 are caught by the frames of the hook catch holes 714 of the slider 700 returned to the original position, and thus cannot be released vertically.

Figure 11:
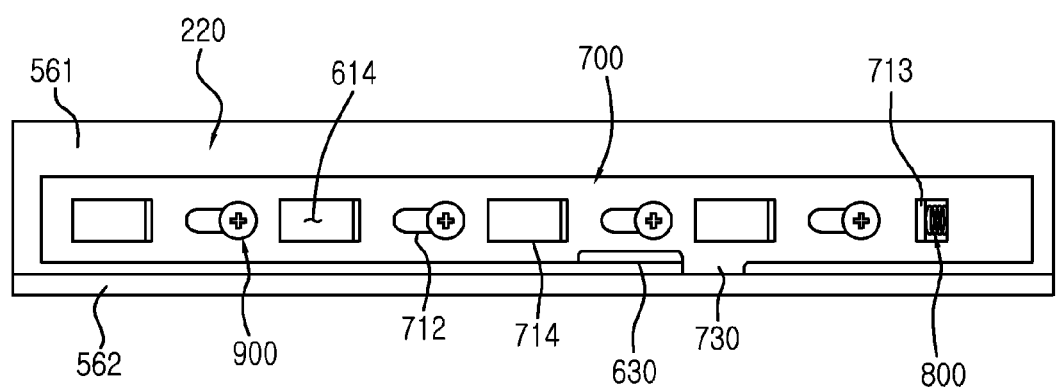
FIG. 11 is diagram illustrating a plane view of a rear housing connected with a bracket, according to an embodiment of the present invention.
Figure 12:
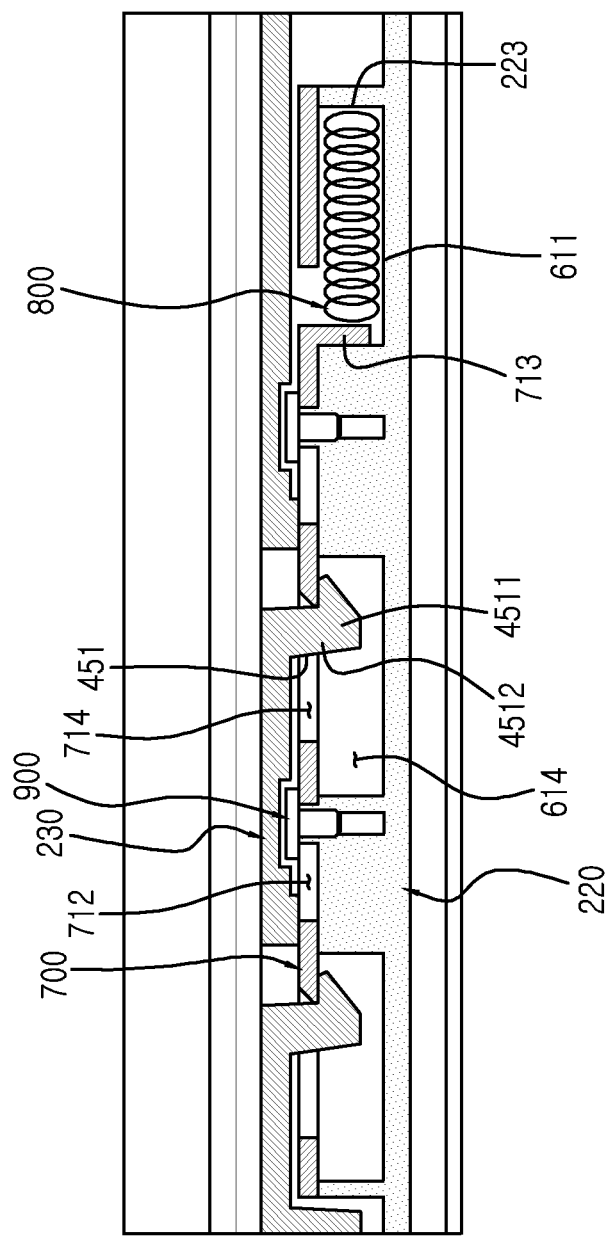
FIG. 12 is a diagram illustrating a cross section showing a connected bracket and rear housing, according to an embodiment of the present invention.

FIG. 11 is a diagram illustrating a plane view of the rear housing when the bracket and the rear housing are connected, according to an embodiment of the present invention. FIG. 12 is a diagram illustrating a cross section showing the connected bracket and rear housing, according to an embodiment of the present invention.

Referring to FIGS. 11 and 12, if the bracket 230 is fully connected to the rear housing 220, the hooks 4511 of the hook arms 451 of the bracket 230 leave the hook catch holes 714 of the slider 700, and are housed in the hook housing parts 614 of the rail 600. If the hooks 4511 of the hook arms 451 of the bracket 230 are completely housed in the hook housing parts 614 of the rail 600, the hook catch holes 714 of the slider 700 are returned to the original position by means of the elastic spring 800, and the hook catch holes 714 of the slider 700 stop the release of the hooks 4511 of the hook arms 451 of the bracket 230. The slider 700 includes the support 713, which is inserted into the compression spring housing part 611 of the rail 600. The compression spring 800 is in touch with the support 713 at one end and is in touch with the inside 223 of the compression spring housing part 611 at the other end. The slider 700 is subjected to elastic support of the compression spring 800 by the support 713, and has the property of trying to return to the original position.

Figure 13:
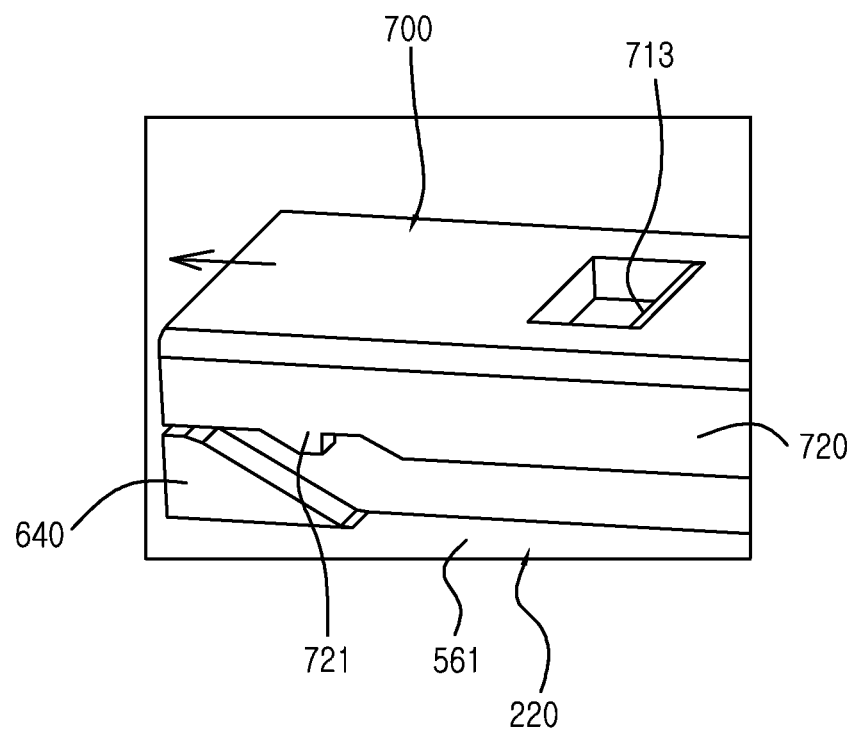
FIGS. 13 and 14 are diagrams illustrating a return stop means of a slider, according to an embodiment of the present invention.
Figure 14:
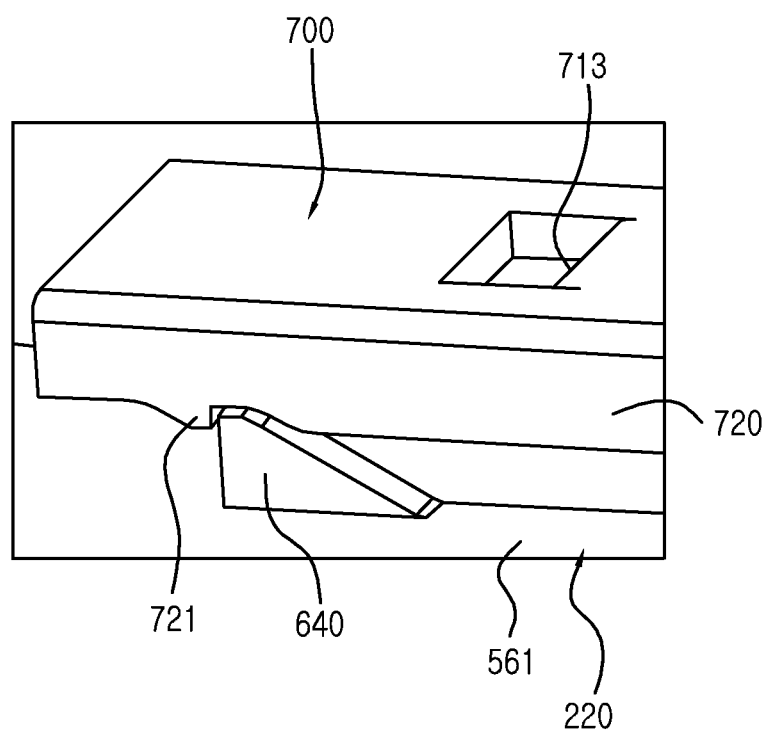

FIGS. 13 and 14 are diagrams illustrating a return stop means of the slider, according to an embodiment of the present invention.

Referring to FIGS. 13 and 14, a male hook 721 is formed at a lower end of the inner sidewall 720 of the slider 700. A female hook 640 is formed in the bottom 561 of the rear housing 220 and is hooked with the male hook 721 of the slider 700. If the slider 700 compresses the compression spring 800 while moving a threshold distance or more, the male hook 721 of the slider 700 is hooked to the female hook 640 of the rear housing 220, and thus the slider 700 cannot be returned by the elasticity of the compression spring 800.

Figure 15:
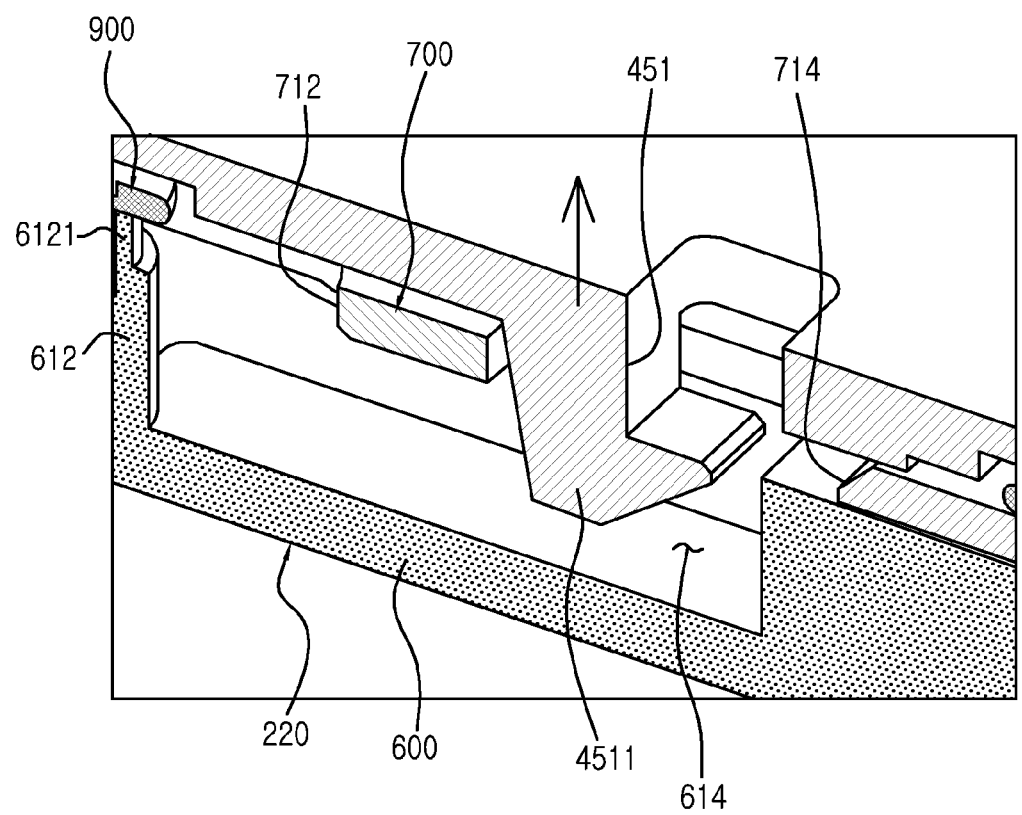
FIG. 15 is a diagram illustrating cross section that shows a state of a bracket and a rear housing dependent on an operation of a return stop means of a slider, according to an embodiment of the present invention.
Figure 16:
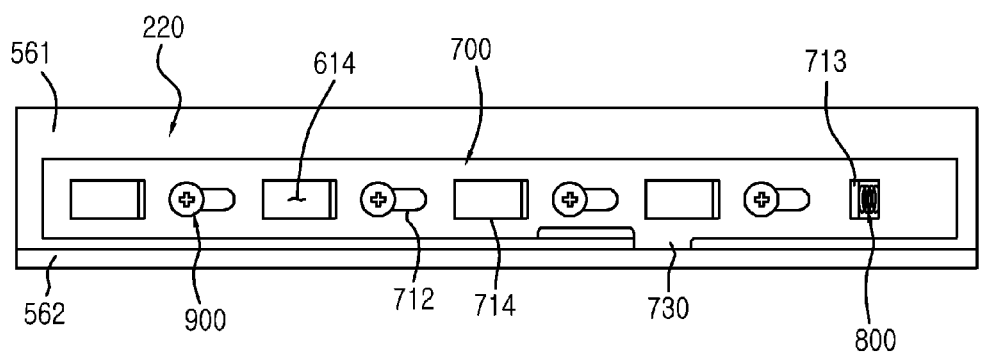
FIG. 16 is a diagram illustrating a plane view of a rear housing dependent on an operation of a return stop means of a slider, according to an embodiment of the present invention.
Figure 17:
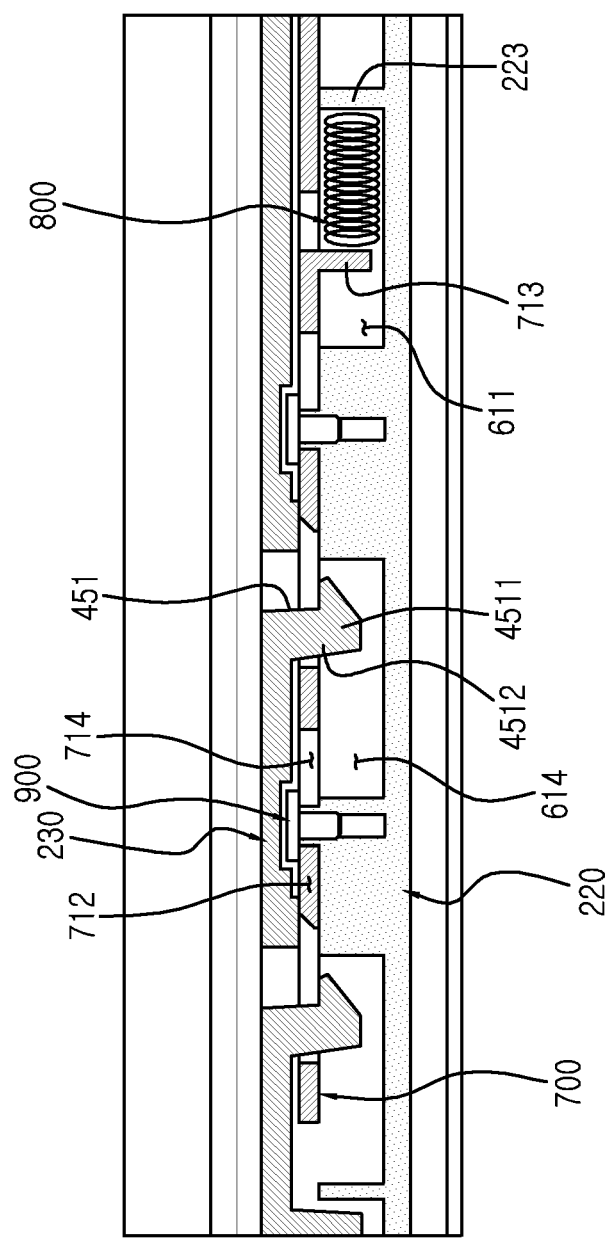
FIG. 17 is a diagram illustrating a cross section that shows a state of a bracket and a rear housing dependent on an operation of a return stop means of a slider, according to an embodiment of the present invention.

FIG. 15 is a diagram illustrating a cross section that shows a state of the bracket and the rear housing dependent on an operation of the return stop means of the slider, according to an embodiment of the present invention. FIG. 16 is a diagram illustrating a plane view of the rear housing dependent on the operation of the return stop means of the slider, according to an embodiment of the present invention. FIG. 17 is a diagram illustrating a cross section showing the state of the bracket and the rear housing dependent on the operation of the return stop means of the slider, according to an embodiment of the present invention.

Referring to FIGS. 15 to 17, the return stop means 640 and 721 may stop the slider 700 from returning to the original position against the elastic repulsive force of the compression spring 800. By the return stop means, the hooks 4511 of the hook arms 451 of the bracket 230 are not subjected to the restraint of the hook catch holes 714 of the slider 700, and are separable. A user can use the return stop means 640 and 721 by inserting a pin into a gap between the rear housing 220 and the bracket 230, and applying force to the outer sidewall 730 of the slider 700 using the inserted pin. The outer sidewall 730 of the slider 700 may be post-processed in dark color such that the outer sidewall 730 is not seen through the gap between the rear housing 220 and the bracket 230.

Figure 18:
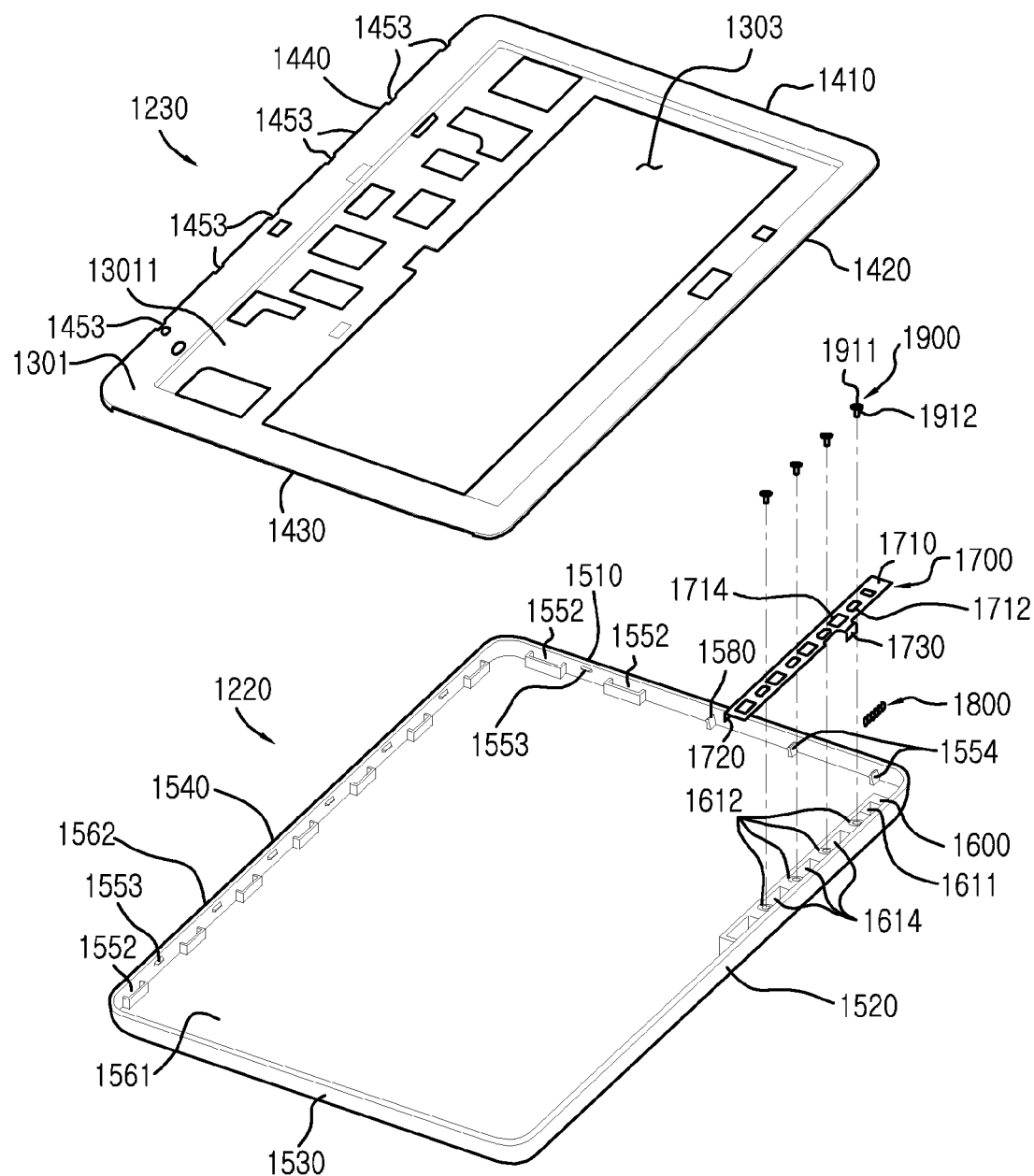
FIG. 18 is a diagram illustrating a perspective view of a connected bracket and rear housing, according to another embodiment of the present invention.

FIG. 18 is a diagram illustrating a perspective view of a connection between the bracket and the rear housing, according to another embodiment of the present invention.

Referring to FIG. 18, an upper part 1301 of bracket 1230 has a groove 13011 capable of safely mounting the touch screen 101. The bracket 1230 has an opening 1303 fixing a metal plate 3201 to which the battery 320 is attached. The vertically extended hook arms and coupling protrusions are formed in the lower parts of left, lower, right, and upper four frames 1410, 1420, 1430, and 1440 of the bracket 1230. Hook catch jaws 1453 of the shape being opened outside are formed in the upper frame 1440 of the bracket 1230.

A rear housing 1220 can be a square vessel shape composed of a bottom 1561 and sidewalls 1562. Connection portions between the bottom 1561 and the sidewalls 1562 can be of a smooth shape. Connection portions between the sidewalls 1562 can be smooth rounded corners. The sidewalls 1562 may be erected vertically with respect to the bottom 1561, or in alternative embodiments may not be erected vertically.

Coupling ribs 1552 being connectable with the coupling protrusions of the bracket 1230 are formed inside four frames 1510, 1520, 1530, and 1540 of the rear housing 1220. If the rear housing 1220 and the bracket 1230 are connected with each other, the coupling protrusions of the bracket 1230 are fitted into grooves of the coupling ribs 1552 of the rear housing 1220. The coupling ribs 1552 are connected to the bottom 1561 and sidewalls 1562 of the rear housing 1220, and the sidewalls 1562 cannot be widened outside a predetermined extent or more by means of the coupling ribs 1552.

Hook protrusions 1553 connectable with the hook catch jaws 1453 of the bracket 1230 are formed inside the sidewalls 1562 of the rear housing 1220. For example, when the rear housing 1220 and the bracket 1230 are connected, the hook protrusions 1553 are restrained from riding and going over the hook catch jaws 1453 of the bracket 1230 and being released from the hook catch jaws 1453 of the bracket 1230, under elastic bending deformation of the sidewalls 1562.

Rail 1600 is installed on the bottom 1561 of the frame 1520 of one side of the rear housing 1220. The rail 1600 is generally a rectangular-parallelepiped horizontal member. Compression spring housing parts 1611 capable of housing compression springs 1800 and screw coupling parts 1612 for coupling with screws 1900 are formed in upper parts of the rail 1600. Hook housing parts 1614 are formed in the upper parts of the rails 1600 to house hooks formed at ends of the hook arms of the bracket 1230. A space can be provided between a lateral part 1630 of the rail 1600 and the sidewalls 1562 of the rear housing 1220.

Slider 1700 is safely mounted on the rail 1600, and is slidable movable in a lengthwise direction of the rail 1600 while being elastically supported by the compression spring 1800. The slider 1700 includes an upper wall 1710 being in contact with an upper part of the rail 1600, an inner sidewall 1720 being in contact with an inner lateral part of the rail 1600, and an outer sidewall 1730 being in contact with an outer lateral part of the rail 1600. The outer sidewall 1730 of the slider 1700 is arranged in the space between the outer lateral part of the rail 1600 and the sidewalls 1562 of the rear housing 1220. The outer sidewall 1730 of the slider 1700 is smaller than the inner sidewall 1720 of the slider 1700. The upper wall 1710 of the slider 1700 has guide holes 1712 provided lengthwise in the movement direction of the slider 1700. The screw coupling parts 1612 of the rail 1600 extend vertically and go through the guide holes 1712 of the slider 1700. If the slider 1700 is moved, the screw coupling parts 1612 of the rail 1600 on the guide holes 1712 of the slider 1700 can be changed in position.

The slider 1700 includes a support inserted into the compression spring housing part 1611 of the rail 1600. The compression spring 1800 is in contact with the support of the slider 1700 at one end, and with the inside of the compression spring housing part 1611 at the other end. The slider 1700 is subjected to elastic support of the compression spring 1800 by means of the support. The slider 1700 has the property of trying to return to the original position by means of the compression spring 1800.

The upper wall 1710 of the slider 1700 has hook catch holes 1714 hookable with the hook arms of the bracket 1230. Hooks of the hook arms of the bracket 1230 have inclined surfaces of a shape of getting slimmer as going to the terminal. Frames of the hook catch holes 1714 of the slider 1700 can have inclined surfaces matching with the inclined surfaces of the hooks 4511 of the hook arms. If the hooks 4511 of the hook arms of the bracket 1230 pass through the hook catch holes 1714 of the slider 1700, the frames of the hook catch holes 1714 of the slider 1700 are pressurized by the hooks 4511 of the hook arms of the bracket 1230 and thus, the slider 1700 is sliding movable. If the hooks 4511 of the hook arms of the bracket 1230 are completely housed in the hook housing parts 1614 of the rail 1600, the slider 1700 can be returned to the original position. The hooks 4511 of the hook arms of the bracket 1230 housed in the hook housing parts 1614 of the rail 1600 are caught by the frames of the hook catch holes 1714 of the slider 1700 returned to the original position and thus cannot be released vertically.

A male hook is formed at a lower end of the inner sidewall 1720 of the slider 1700. A female hook is formed in the bottom 1561 of the rear housing 1220 such that the female hook can be hooked with the male hook of the slider 1700. If the slider 1700 compresses the compression spring 1800 while moving a threshold distance or more, the male hook of the slider 1700 is connected to the female hook of the rear housing 1220, and thus the slider 1700 cannot be returned by the elasticity of the compression spring 1800.

Necks 1912 of the screws 1900 have threads of predetermined pitches, and the necks 1912 of the screws 1900 can be coupled to the screw coupling parts 1612 of the rail 1600 going through the guide holes 1712 of the slider 1700. The upper wall 1710 of the slider 1700 is arranged between heads 1911 of the screws 1900 and the upper part of the rail 1600. The heads 1911 of the screws 1900 have larger widths than the guide holes 1712 of the slider 1700 and thus, the slider 1700 cannot be released vertically by means of the heads 1911 of the screws 1900.

Figure 19:
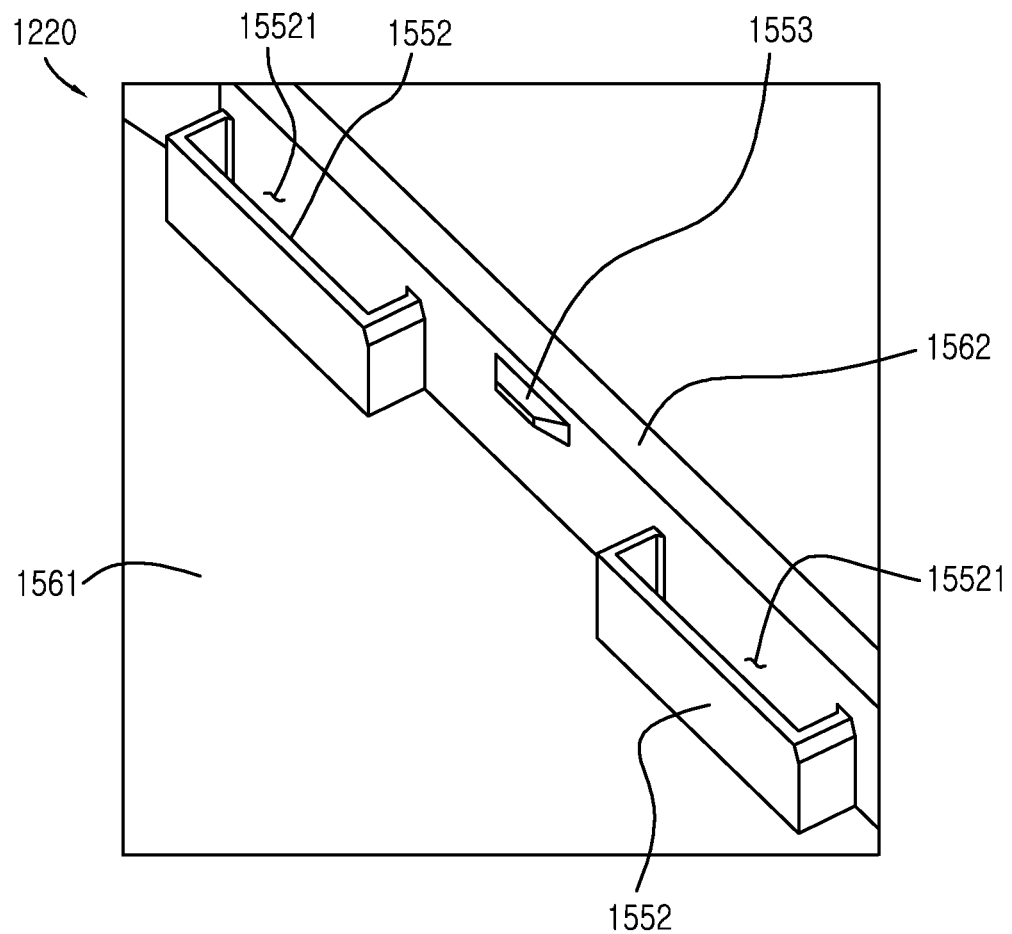
FIG. 19 is a diagram illustrating the inside of a rear housing, according to another embodiment of the present invention.

FIG. 19 is a diagram illustrating the inside of a rear housing, according to an embodiment of the present invention.

Referring to FIG. 19, the coupling ribs 1552 are connected to the bottom 1561 and sidewalls 1562 of the rear housing 1220. As described above, the coupling ribs 1552 can stop the sidewalls 1562 from being widened outside a predetermined extent or more. The coupling ribs 1552 have grooves 15521 capable of fitting the coupling protrusions of the bracket 1230. The hook protrusions 1553 are formed at the sidewalls 1562 of the rear housing 1220, and are arranged between the coupling ribs 1552.

Figure 20:
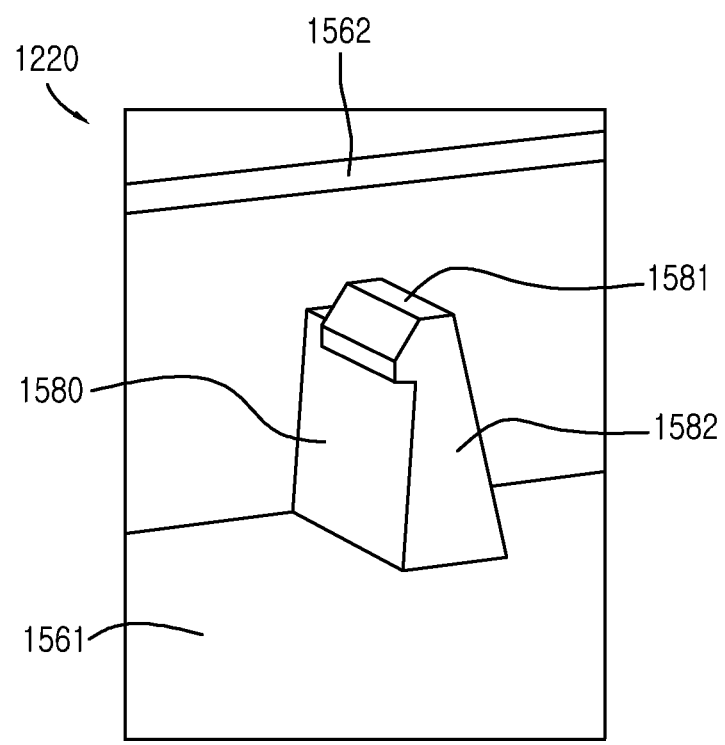
FIG. 20 is a diagram illustrating the inside of a rear housing, according to another embodiment of the present invention.

FIG. 20 is a diagram illustrating the inside of a rear housing, according to another embodiment of the present invention.

Referring to FIG. 20, a hook arm 1580 extends from the bottom 1561 of the rear housing 1220. The hook arm 1580 is connected to the bottom 1561 of the rear housing 1220 and the sidewall 1562 thereof. The hook arm 1580 can stop the sidewall 1562 from being widened a predetermined extent or more. The hook arm 1580 includes an extension part 1582 extending from the bottom 1561 of the rear housing 1220, and a hook 1581 formed at an upper part of the extension part 1582. The hook 1581 of the hook arm 1580 can be hooked to a hook catch hole of the bracket 1230. The hook arm 1580 can be formed inside the frame 1510 neighboring a frame at which the rail 1600 is formed. The aforementioned coupling ribs 1552 and hook protrusions 1553 may not be arranged between the hook arms 1580.

Figure 21:
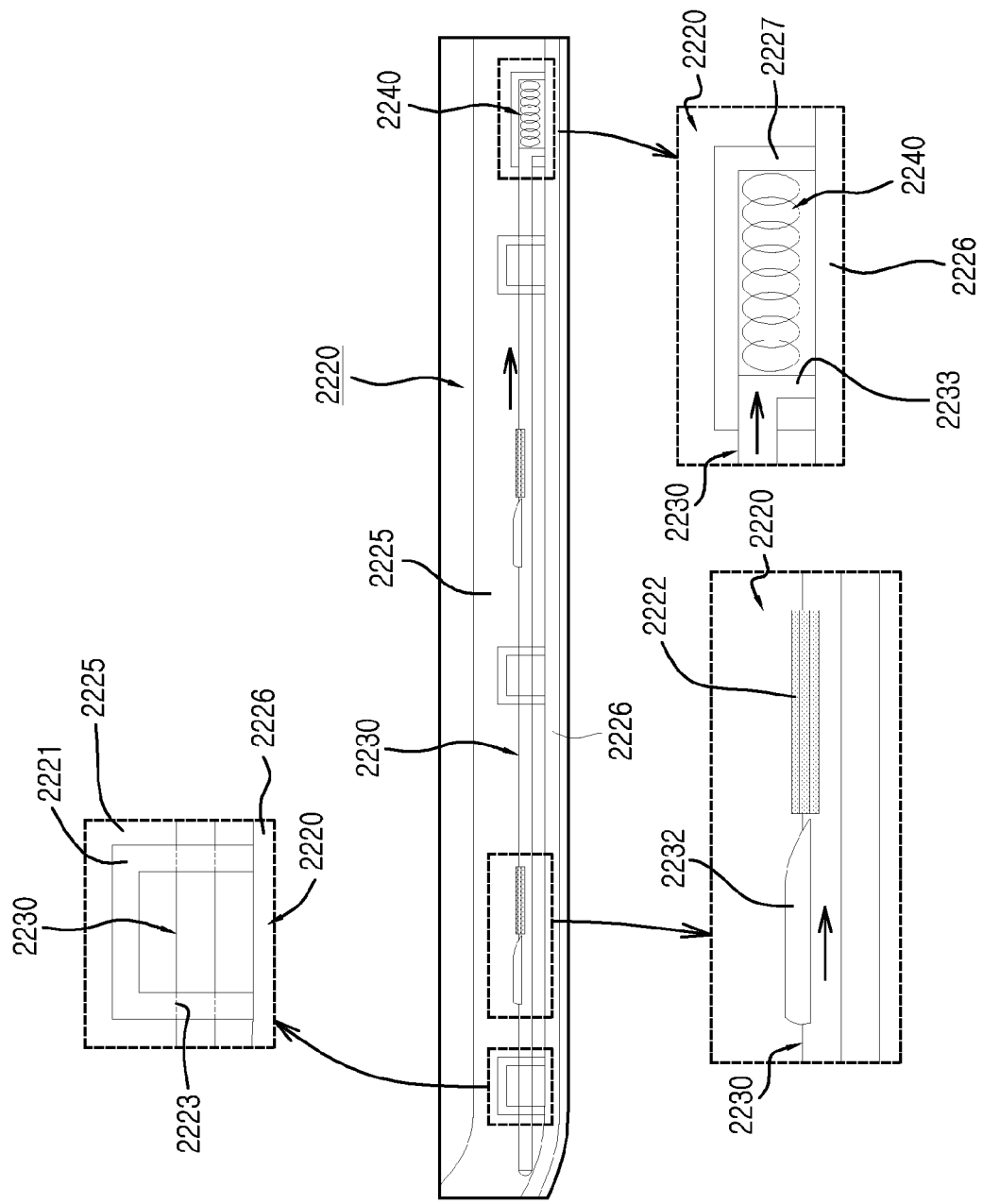
FIG. 21 is a diagram illustrating a rear housing, according to various embodiments of the present invention.

FIG. 21 is a diagram illustrating a rear housing, according to various embodiments of the present invention.

Referring to FIG. 21, a shaft 2230 movable in a lengthwise direction is installed inside a frame of a rear housing 2220. A plurality of ribs 2221 are formed inside the frame of the rear housing 2220 to connect to a bottom 2225 and a sidewall 2226 of the rear housing 2220. The ribs 2221 have holes 2223, and the shaft 2230 goes through the holes 2223 of the ribs 2221. A compression spring housing part 2227 is formed inside the frame of the rear housing 2220 to connect to the bottom 2225 and sidewall 2226 of the rear housing 2220 and house a compression spring 2240. A support 2233 is prepared at an end of the shaft 2230, and the support 2233 is housed in the compression spring housing part 2227 of the rear housing 2220. The compression spring 2240 is in contact with the support 2233 of the shaft 2230 at one end, and is in contact with the inside of the compression spring housing part 2227 at the other end. Protrusions 2232 are formed on a surface of the shaft 2230. The protrusions 2232 are formed lengthwise in the movement direction of the shaft 2230, and have inclined surfaces. Hooks 2222 are formed inside the frame of the rear housing 2220 to extend from the bottom 2225 of the rear housing 2220. If the shaft 2230 is moved, the protrusions 2232 of the shaft 2230 are superposed with the hooks 2222, and the hooks 2222 are elastically bent and deformed by the protrusions 2232 of the shaft 2230.

Figure 22:
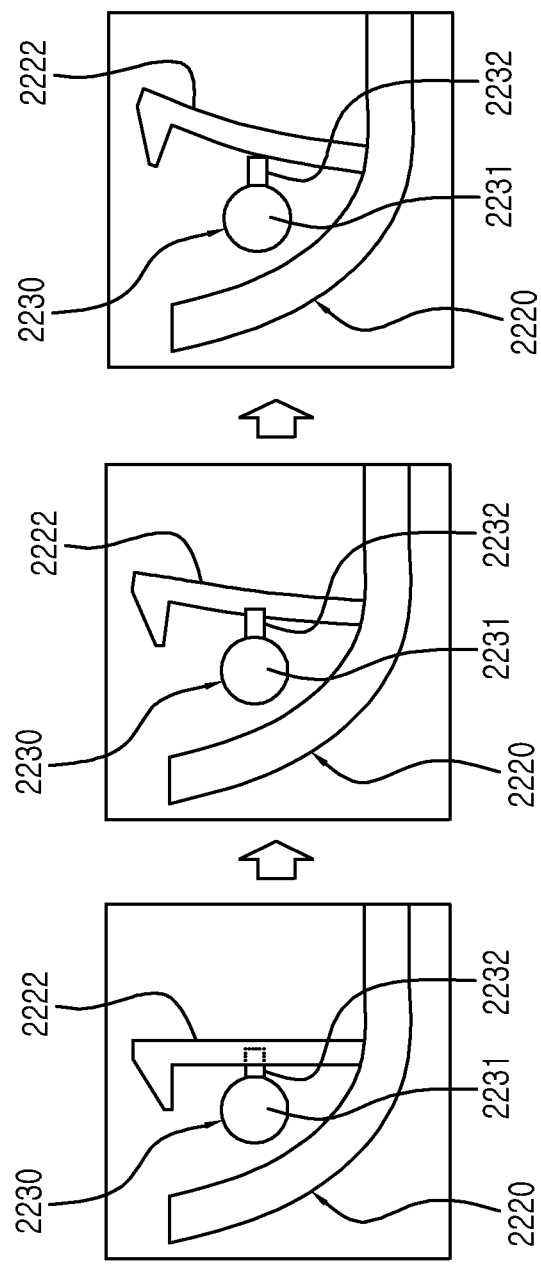
FIG. 22 is a diagram illustrating an operation of the rear housing of FIG. 21, according to an embodiment of the present invention.

FIG. 22 is a diagram illustrating an operation of the rear housing of FIG. 21, according to an embodiment of the present invention.

Referring to FIG. 22, the extent the protrusions 2232 of the shaft 2230 overlap the hooks 2222 due to the movement of the shaft 2230 is increased. Because the protrusions 2232 of the shaft 2230 have inclined surfaces, the extent of elastic bending and deformation of the hooks 2222 can increase gradually. If the hooks 2222 and the protrusions 2232 are superposed with each other, the shaft 2230 is inversely pressurized by the hooks 2222. The shaft 2230 may not be bent because the shaft 2230 is arranged in the holes 2223 of the ribs 2221. The support 2233 of the shaft 2230 is elastically supported by the compression spring 2240, and the shaft 2230 has the property of trying to return to the original position in the absence of external force. If the hooks 2222 are bent due to the movement of the shaft 2230, the hooks 2222 can be released from hook catch jaws of a bracket, and the bracket can be separated from the rear housing 2220.

Figure 23:
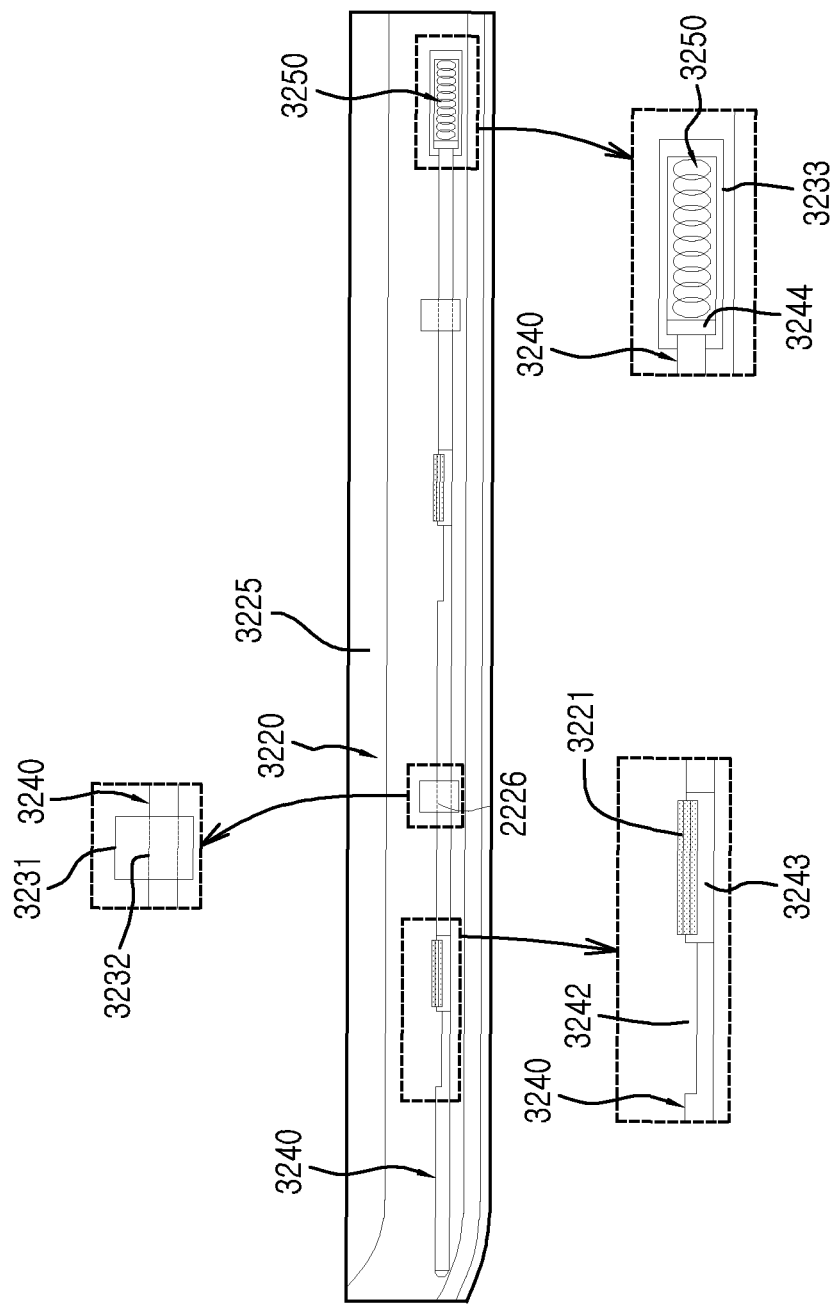
FIG. 23 is a diagram illustrating a coupling structure between a bracket and a rear housing, according to various embodiments of the present invention.

FIG. 23 is a diagram illustrating a coupling structure between a bracket and a rear housing, according to various embodiments of the present invention.

Referring to FIG. 23, a shaft 3240 movable in lengthwise direction is installed at a frame of a bracket. A plurality of ribs 3231 is installed inside the frame of the bracket. The ribs 3231 have holes 3232, and the shaft 3240 goes through the holes 3232 of the ribs 3231. A compression spring housing part 3233 is formed inside the frame of the bracket to house a compression spring 3250. A support 3244 is prepared at an end of the shaft 3240, and the support 3244 is housed in the compression spring housing part 3233 of the bracket. The compression spring 3250 is in contact with the support 3244 of the shaft 3240 at one end, and is in contact with the inside of the compression spring housing part 3233 at the other end. The support 3244 of the shaft 3240 is elastically supported by the compression spring 3250, and the shaft 3240 has the property of trying to return to the original position in the absence of external force. Hooks 3221 are formed at a frame of the rear housing 2220 to extend from a bottom 3225. In the absence of the movement of the shaft 3240, the hooks 3221 are caught by a catch part 3243 formed in the shaft 3240, and thus, the hooks 3221 cannot be separated. If the shaft 3240 is moved to a suitable place, the hooks 3221 can be separated through a release part 3242 formed in the shaft 3240.

Figure 24:
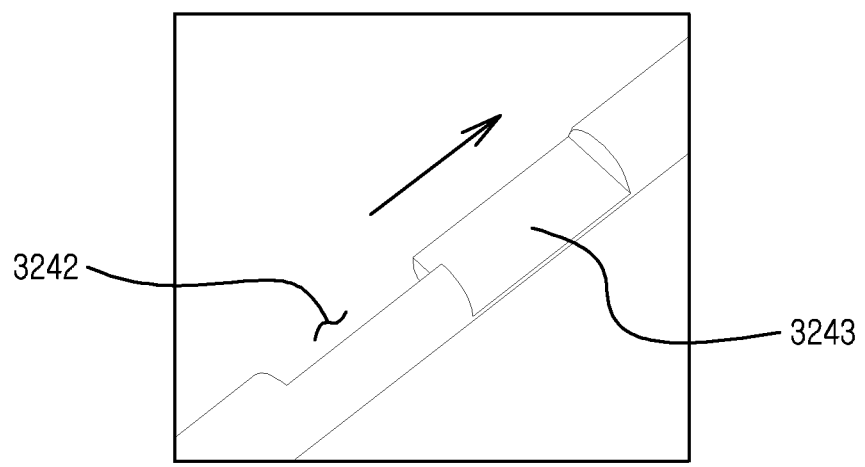
FIG. 24 is a diagram illustrating a catch part and release part of a shaft of the coupling structure of FIG. 23, according to an embodiment of the present invention.

FIG. 24 is a diagram illustrating the catch part and release part of the shaft of FIG. 23, according to an embodiment of the present invention.

Referring to FIG. 24, the catch part 3243 and release part 3242 of the shaft 3240 are shaped as two semi-circular cylinders connected to each other together in lengthwise direction. The semi-circular cylinders are formed to have a difference of a rotation angle of 90 degrees. The hooks 3221 of the rear housing 3220 leave the catch part 3243 of the shaft 3240 and are located in the release part 3242 due to the movement of the shaft 3240 and thus, the rear housing 3220 can be separated from the bracket.

Figure 25:
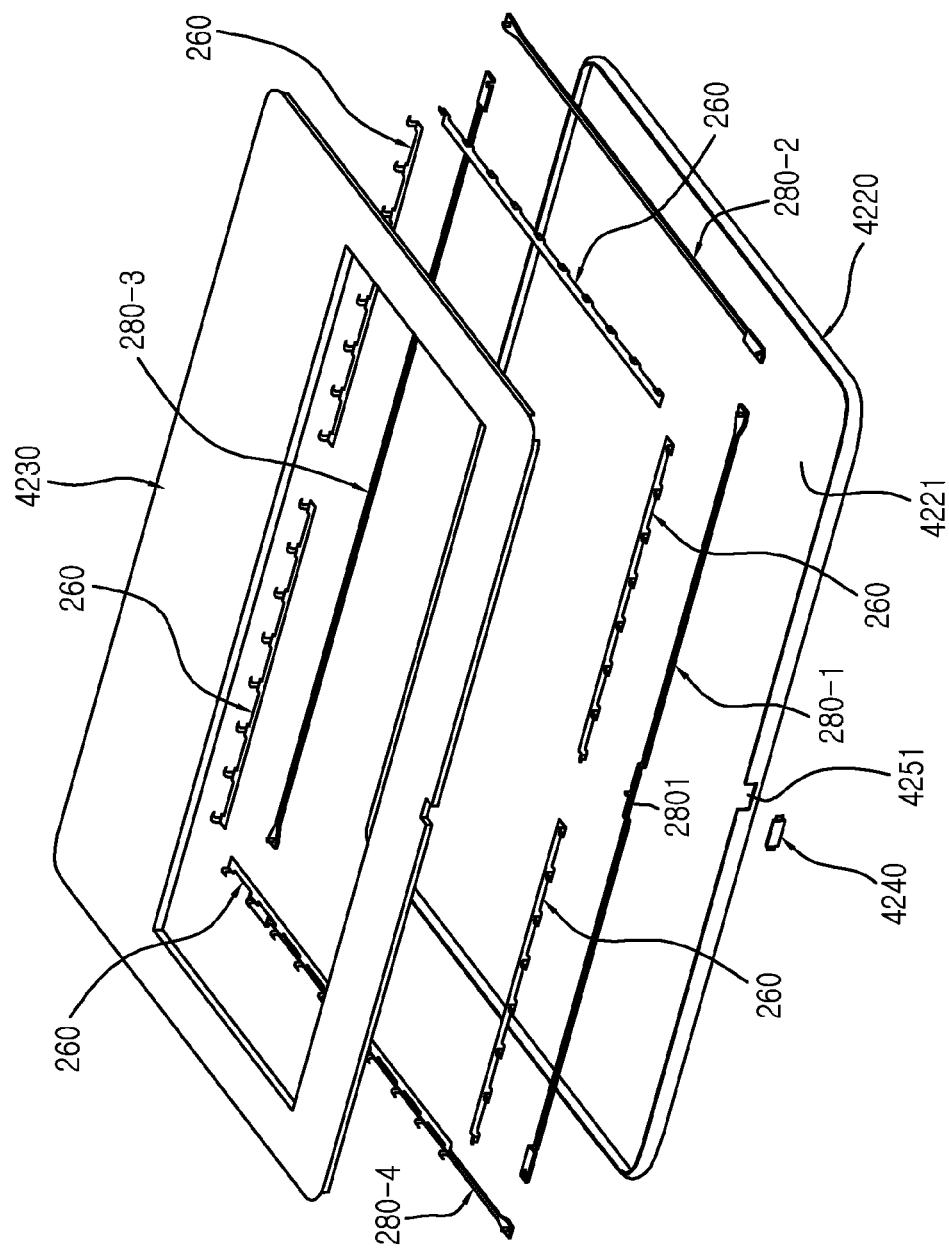
FIGS. 25 and 26 are diagrams illustrating a perspective view and a cross section of a connection between a bracket and a rear housing, according to another embodiment of the present invention.
Figure 26:
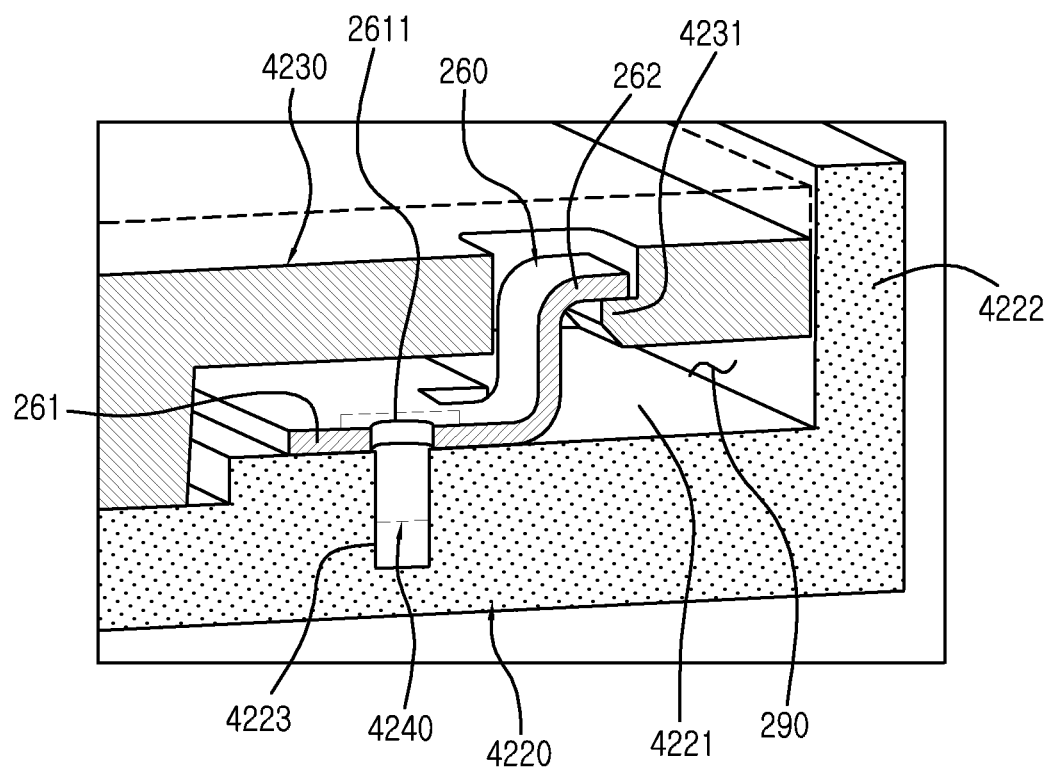

FIGS. 25 and 26 are diagrams illustrating a perspective view and a cross section showing a connection between a bracket and a rear housing, according to an embodiment of the present invention.

Referring to FIGS. 25 and 26, hook supports 260 are fixed to a bottom 4221 inside four frames of a rear housing 4220. The hook supports 260 include a fixing part 261 fixed to the rear housing 4220, and hooks 262 extending up from the fixing part 261 and arranged at predetermined intervals. The fixing part 261 has holes 2611 for screw coupling to the bottom 4221 of the rear housing 4220. The bottom 4221 of the rear housing 4220 has screw coupling grooves 4223 for screw coupling. Screws 4240 go through the holes 2611 of the fixing part 261 of the hook support 260, and are coupled into the screw coupling grooves 4223 of the rear housing 4220. The hook support 260 may be molded by insert injection, together with the rear housing 4220. The hooks 262 of the hook support 260 can be elastically bent and deformed under support of the fixing part 261 fixed to the rear housing 4220.

A bracket 4230 has hook catch jaws 4231 capable of hooking with each of the hooks 262 of the hook support 260. If the hooks 262 of the hook support 260 pass through the hook catch jaws 4231 of the bracket 4230, the hooks 262 can be elastically bent and deformed inside. If the hooks 262 of the hook support 260 go completely through the hook catch jaws 4231 of the bracket 4230, the hooks 262 are returned to the original state, and cannot be released by means of the hook catch jaws 4231 of the bracket 4230.

Links 280 movable in a lengthwise direction are installed inside the four frames of the rear housing 4220. The links 280 are arranged in a space 290 between the hook support 260 and a sidewall 4222 of the rear housing 4220. A specific link 280-1 can have a protrusion 2801 used for handling to move the link 280-1. If one link 280-1 is moved in lengthwise direction by a user, the other links 280-2, 280-3, and 280-4 also interwork with this link 280-1 and move in lengthwise direction. Ends of the links 280 can be connected with each other. The user can move the link 280-1 by applying force to the protrusion 2801 of the link 280-1 using a specific tool (for example, a pin, a jig, etc.) through an opening 4241 provided at the sidewall 4222 of the rear housing 4220. The opening 4241 provided at the sidewall 4222 of the rear housing 422 can be plugged with a cover 4240.

Figure 27:
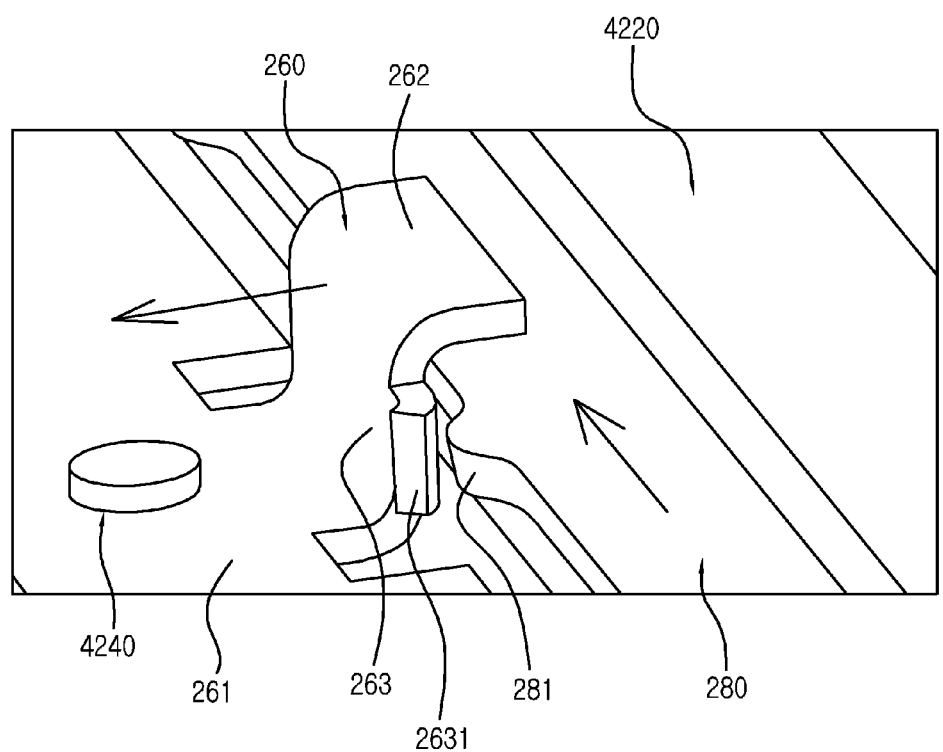
FIG. 27 is a diagram illustrating interworking between a hook support and links of the connection of FIG. 25, according to an embodiment of the present invention.

FIG. 27 is a diagram illustrating interworking between the hook support and the links of FIG. 25, according to an embodiment of the present invention.

Referring to FIG. 27, the link 280 has the protrusion 281 capable of, upon movement of the links 280, elastically bending and deforming the hook 262 of the hook support 260. If the link 280 is moved in lengthwise direction, the protrusion 281 of the link 280 is moved to a connection part 263 connecting the hook 262 of the hook support 260 with the fixing part 261 of the hook support 260, and thus, the hook 262 can be moved inside. Because the hook 262 is moved inside by means of the protrusion 2801 of the link 280, the hook 262 can be released from the hook catch jaw 4231 of the bracket 4230.

Figure 28:
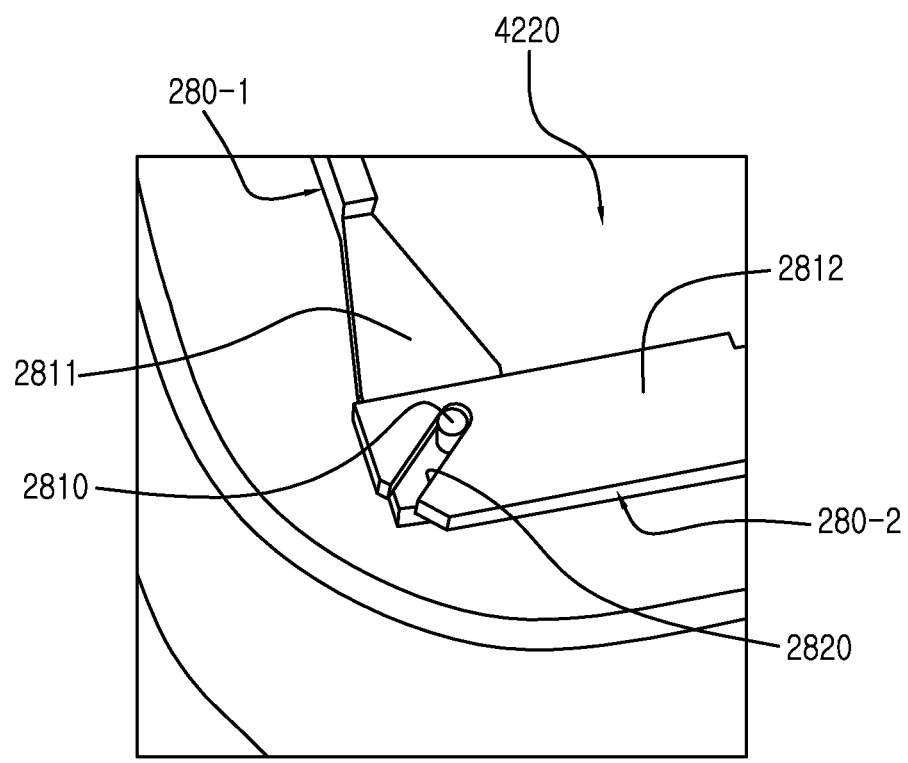
FIG. 28 is a diagram illustrating interworking between links of the connection of FIG. 25, according to an embodiment of the present invention.
Figure 29:
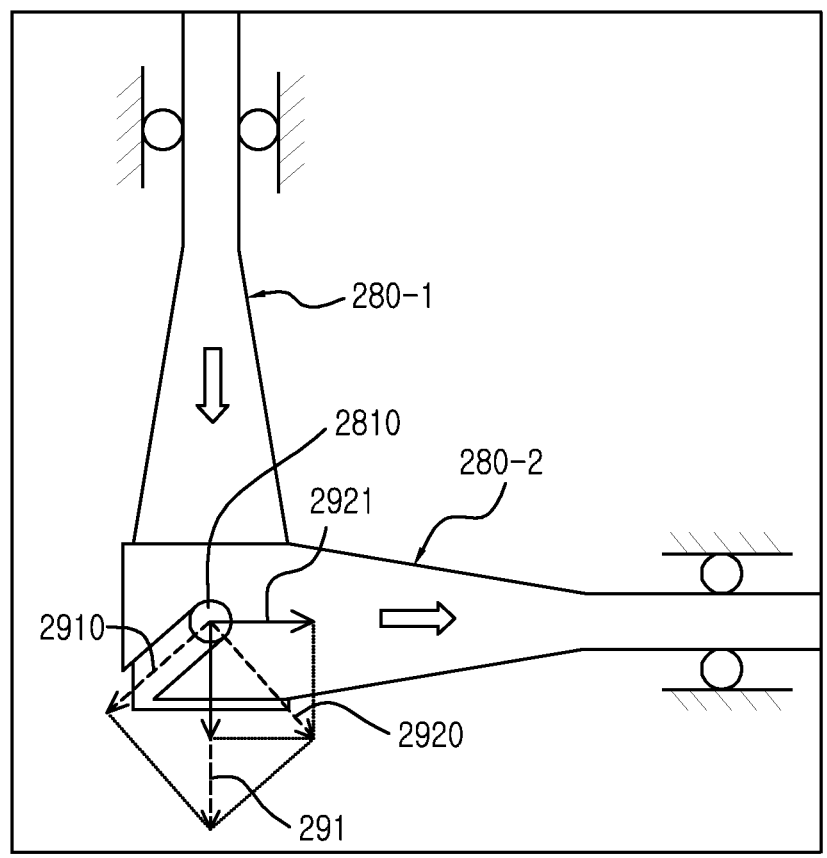
FIG. 29 is a diagram schematically illustrating an operation of a linkage of the connection of FIG. 25, according to an embodiment of the present invention.

FIG. 28 is a diagram illustrating interworking between the links of FIG. 25, according to an embodiment of the present invention. FIG. 29 is a diagram schematically illustrating an operation of a linkage of FIG. 25, according to an embodiment of the present invention.

Referring to FIG. 28, commonly, the 1st link 280-1 of the links 280 has a cylindrical protrusion 2810 at one end 2811, and the 2nd link 280-2 of the links 280 has an opening 2820, which is laid lengthwise in diagonal direction with respect to the lengthwise direction of the links 280, at another end 2812. The opening 2820 has a width corresponding to a width of the cylindrical protrusion 2810, and is provided lengthwise in a straight line. The opening 2820 has one opened side.

Referring to FIG. 29, if the 1st link 280-1 is moved, a force 291 applied to the cylindrical protrusion 2810 of the 1st link 280-1 can be decomposed into force 2910 trying to slide along an inner surface of the opening 2820 of the 2nd link 280-2, and force 2920 vertically pressurizing the inner surface of the opening 2820 of the 2nd link 280-2. A force 2921 capable of moving the 2nd link 280-2 in lengthwise direction is generated from the force 2920 vertically pressurizing the inner surface of the opening 2820 of the 2nd link 280-2. These links 280 can interwork a translational motion of lengthwise direction. The linkages, according to various embodiments, can be 4-links.

Figure 30:
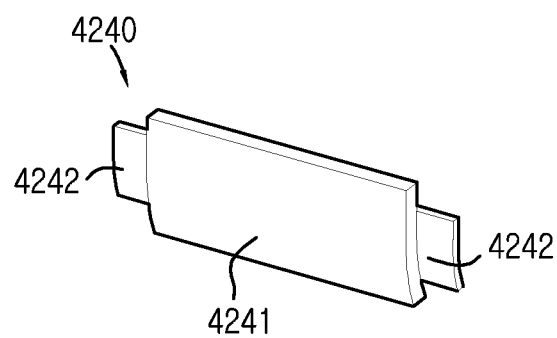
FIG. 30 is a diagram illustrating a perspective view of a cover, according to an embodiment of the present invention.
Figure 31:
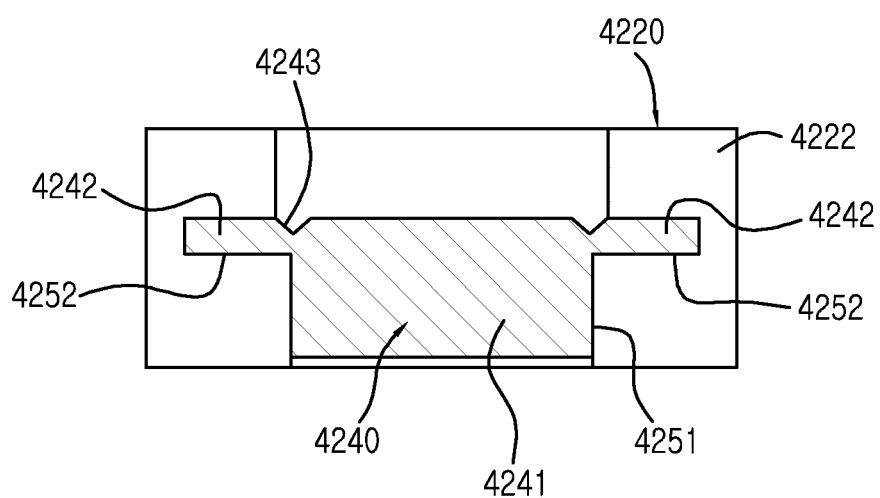
FIG. 31 is a diagram illustrating a cross section of an opening and cover provided at a sidewall of a rear housing, according to an embodiment of the present invention.

FIG. 30 is a diagram illustrating a perspective view of the cover of FIG. 25, according to an embodiment of the present invention. FIG. 31 is a diagram illustrating a cross section of a structure of the opening and cover provided at the sidewall of the rear housing, according to an embodiment of the present invention.

Referring to FIGS. 30 and 31, the cover 4240 includes a body 4241 and an extension part 4242 extending from both sides of the body 4241. The extension part 4242 has a smaller thickness than the body 4241. The sidewall 4222 of the rear housing 4220 has an opening 4251 fitting the body 4241 of the cover 4240, and a groove 4242 fitting the extension part 4242 of the cover 4240. The cover 4240 has a notch 4243 in the rear. If external force is applied to the cover 4240, the cover 4240 is easily destroyed by the notch 4243. A user can destroy the cover 4240 so as to separate the rear housing 4220.

As described above, embodiments of the present invention can connect a detachable housing to an electronic device using a connection force, to the contrary, can easily separate the detachable housing from the electronic device.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
    a front housing arranged in a front portion of the electronic device;
    a bracket connected to the front housing, to which a plurality of electronic parts of the electronic device are affixed; and
    a rear housing arranged in a rear portion of the electronic device and comprising a plurality of sliders and a plurality of rails, each of the plurality of sliders being slidable on the rear housing and each of the plurality of sliders being connected to a respective rail, each of the plurality of sliders being slidable on and elastically supported by each of the plurality of rails, without being released from each of the plurality of rails, and the rear housing being detachable from the bracket by the plurality of sliders, wherein:
the bracket comprises a plurality of hook arms, each having an end with a hook,
each of the plurality of sliders comprises at least one catch hole,
when a respective hook goes through the at least one catch hole of each of the plurality of sliders, a force is applied to a frame of the at least one catch hole of each of the plurality of sliders by the respective hook, and each of the plurality of sliders is moved,
when the respective hook is housed in a groove of each of the plurality of rails after completely going through the at least one catch hole, each of the plurality of sliders is returned to an original position, and the respective hook is caught by the at least one catch hole of each of the plurality of sliders,
the respective hook has an inclined surface with a shape that gets slimmer in a direction toward its end, and
the frame of the at least one catch hole has an inclined surface,
wherein each of the plurality of sliders is removably coupled to a respective one of the plurality of rails, and
wherein the sliders are arranged orthogonally, move dependently on the plurality of hooks, and move orthogonally off each other.

2. The electronic device of claim 1, wherein:
each of the plurality of sliders comprise guide holes provided lengthwise in a movement direction of the at least on slider,
each of the plurality of rails comprise screw coupling parts that each extend through a respective guide hole of each of the plurality of sliders,
each screw coupling part of the plurality of rails is coupled with a screw,
the plurality of sliders are not releasable from the plurality of rails due to the screw, and
the screw coupling parts of the plurality of rails on the guide holes of the plurality of sliders are changed in position according to a movement of the plurality of sliders.

3. The electronic device of claim 1, wherein each of the plurality of sliders comprise a support that is in contact with a first side of a compression spring housed in each of the plurality of rails, and each of the plurality of sliders is elastically supported by the compression spring.

4. The electronic device of claim 1, wherein:
each of the plurality of sliders comprises a male hook at an end,
the rear housing has a plurality of female hooks at an inner surface, and
when each of the plurality of sliders is moved a threshold distance or more, the male hook of each of the plurality of sliders is coupled to a respective female hook of the rear housing, and the plurality of sliders are fixed in position.

5. The electronic device of claim 1, wherein:
the rear housing has a vessel shape comprised of a bottom and a plurality of sidewalls, and
the plurality of rails extend from the bottom of the rear housing, and are arranged adjacent to the plurality of sidewalls of the rear housing.

6. The electronic device of claim 5, wherein:
the rear housing has a plurality of coupling ribs connected to the bottom and the plurality of sidewalls of the rear housing, and
the bracket has coupling protrusions fitted into grooves provided in the plurality of coupling ribs.

7. The electronic device of claim 6, wherein:
the rear housing has a plurality of hook protrusions arranged between the plurality of coupling ribs, and formed at the plurality of sidewalls of the rear housing, and
the bracket has hook catch jaws attachable to the hook protrusions of the rear housing.

* * * * *